United States Patent
Jeon et al.

(10) Patent No.: US 10,375,699 B2
(45) Date of Patent: Aug. 6, 2019

(54) DYNAMIC CONTROL METHOD AND DEVICE OF SCELL IN MOBILE COMMUNICATION SYSTEM

(71) Applicant: Samsung Electronics Co., Ltd., Suwon-si, Gyeonggi-do (KR)

(72) Inventors: Namryul Jeon, Seoul (KR); Hyojoon Kim, Suwon-si (KR); Hanseok Kim, Seoul (KR); Wook Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/551,511

(22) PCT Filed: Feb. 29, 2016

(86) PCT No.: PCT/KR2016/002017
§ 371 (c)(1),
(2) Date: Aug. 16, 2017

(87) PCT Pub. No.: WO2016/137306
PCT Pub. Date: Sep. 1, 2016

(65) Prior Publication Data
US 2018/0035432 A1    Feb. 1, 2018

(30) Foreign Application Priority Data
Feb. 27, 2015    (KR) .................. 10-2015-0028287

(51) Int. Cl.
*H04W 72/04* (2009.01)
*H04W 24/02* (2009.01)
(Continued)

(52) U.S. Cl.
CPC ......... *H04W 72/0486* (2013.01); *H04L 43/16* (2013.01); *H04W 24/00* (2013.01);
(Continued)

(58) Field of Classification Search
CPC ......... H04M 1/72572; H04M 1/72583; H04M 3/42153; H04M 3/58; H04W 72/04;
(Continued)

(56) References Cited

U.S. PATENT DOCUMENTS

2012/0198077 A1    8/2012    Wei
2013/0088983 A1    4/2013    Pragada et al.
(Continued)

FOREIGN PATENT DOCUMENTS

WO    2013/168938 A1    11/2013
WO    2014/076371 A1    5/2014
(Continued)

OTHER PUBLICATIONS

Andreas Roessler et al. "Carrier aggregation—(one) key enabler for LTE-Advanced"; Oct. 2012; pp. 1-13; Rohde&Schwarz; Munchen, Germany.

*Primary Examiner* — Wayne H Cai
(74) *Attorney, Agent, or Firm* — Jefferson IP Law, LLP

(57) ABSTRACT

Provided is a method of configuring a secondary cell (SCell) for a base station (eNB) in a mobile communication system. The method may include: identifying the carrier aggregation (CA) operation mode; identifying the amount of traffic for a user equipment (UE); determining whether to add an SCell in the UE on the basis of the CA operation mode and the traffic amount for the UE; and transmitting an SCell addition request message to the UE according to the determination result. There is also provided a base station applying the above method. In addition, there are provided a user equipment communicating with the base station and an SCell configuration method for the user equipment.

15 Claims, 26 Drawing Sheets

(51) Int. Cl.
*H04W 24/10* (2009.01)
*H04L 12/26* (2006.01)
*H04W 24/00* (2009.01)
*H04W 72/08* (2009.01)
*H04W 88/02* (2009.01)
*H04W 88/08* (2009.01)

(52) U.S. Cl.
CPC ........... *H04W 24/02* (2013.01); *H04W 24/10* (2013.01); *H04W 72/04* (2013.01); *H04W 72/085* (2013.01); *H04W 88/02* (2013.01); *H04W 88/08* (2013.01)

(58) Field of Classification Search
CPC ........... H04W 72/085; H04W 72/0486; H04W 24/00; H04W 24/02; H04W 24/10; H04W 88/02; H04W 88/08
See application file for complete search history.

(56) References Cited

U.S. PATENT DOCUMENTS

| | | |
|---|---|---|
| 2013/0107862 A1 | 5/2013 | Yang et al. |
| 2013/0116011 A1 | 5/2013 | Lee et al. |
| 2013/0237208 A1 | 9/2013 | Vujcic |
| 2013/0242777 A1 | 9/2013 | Choi et al. |
| 2014/0050113 A1 | 2/2014 | Rosa et al. |
| 2014/0086094 A1 | 3/2014 | Keskitalo et al. |
| 2014/0106764 A1 | 4/2014 | Huang |
| 2015/0049753 A1 | 2/2015 | Park et al. |
| 2015/0257163 A1 | 9/2015 | Dalsgaard et al. |
| 2015/0373597 A1 | 12/2015 | Kim et al. |
| 2016/0021585 A1 | 1/2016 | Pedersen et al. |

FOREIGN PATENT DOCUMENTS

| | | |
|---|---|---|
| WO | 2014/142512 A1 | 9/2014 |
| WO | 2014/161576 A1 | 10/2014 |

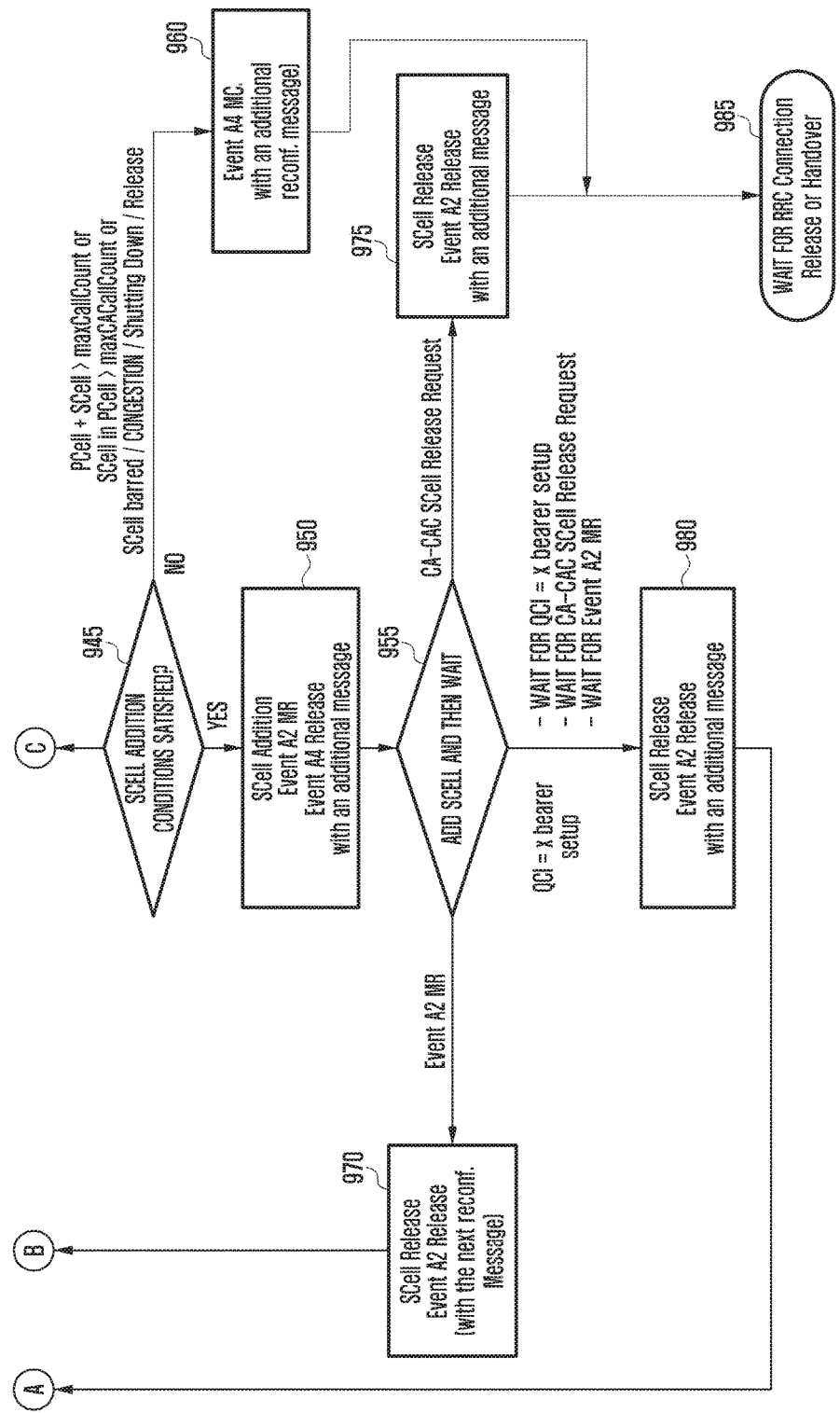

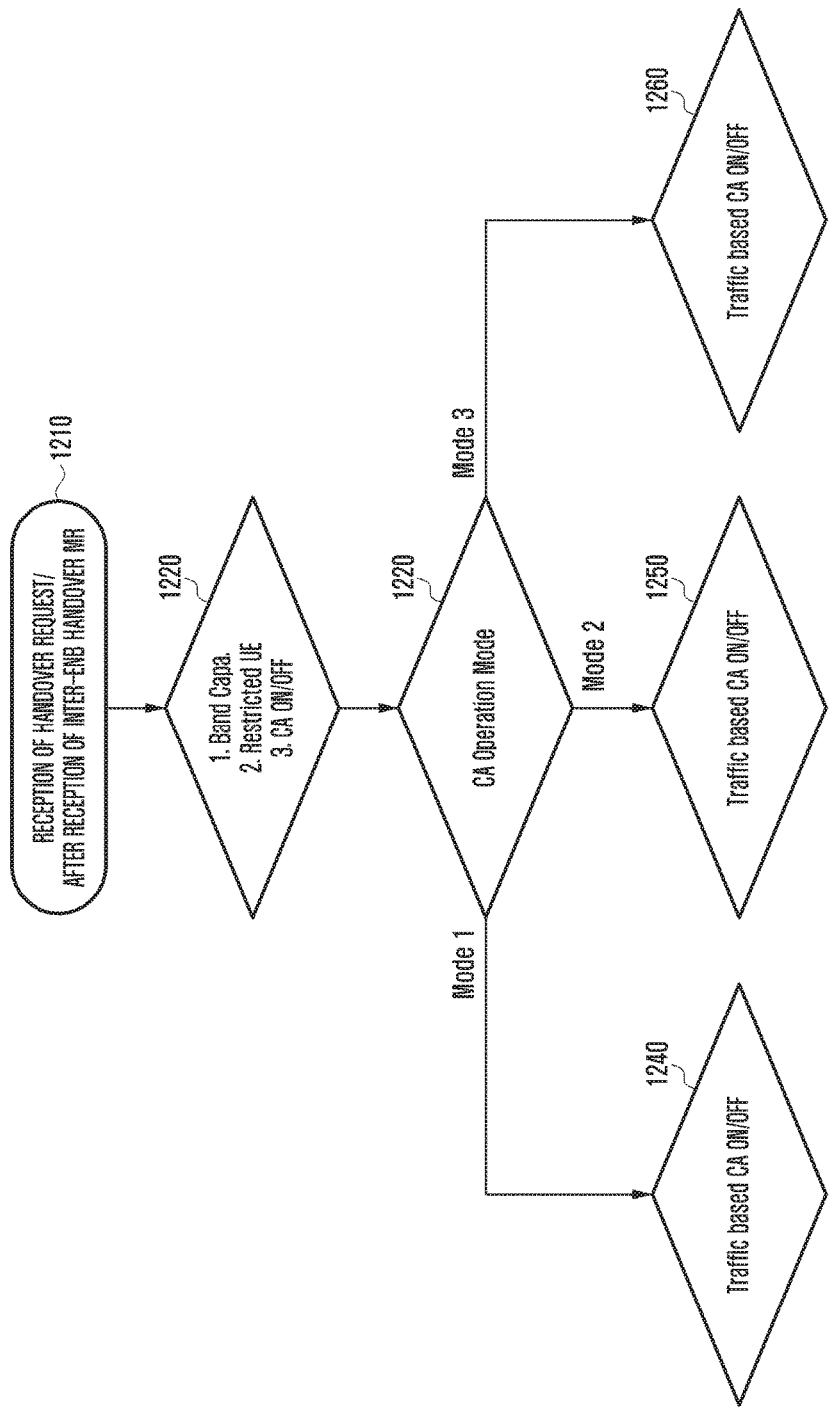

DYNAMIC CONTROL METHOD AND DEVICE OF SCELL IN MOBILE COMMUNICATION SYSTEM

TECHNICAL FIELD

The present invention relates to a method and apparatus for dynamic control of an Scell in a mobile communication system. More particularly, the present invention relates to a method and apparatus for dynamically controlling an SCell in a mobile communication system supporting carrier aggregation (CA) on the basis of at least one of reception power or traffic of a user equipment.

BACKGROUND ART

In general, mobile communication systems have been developed to provide communication while securing mobility of users. Thanks to rapid technical advances, mobile communication systems have reached the stage of providing high-speed data communication services as well as voice communication services. In recent years, evolved studies on long term evolution-advanced (LTE-A) are underway in 3GPP as one of the next generation mobile communication systems. LTE-A has been almost completed in late 2010 for commercialization, and technologies with higher data rates than currently available rates have been discussed.

With completion of the LTE specification, recently, active discussions are in progress on evolved LTE systems (LTE-Advanced, LTE-A) to further improve the transmission speed by combining various new technologies with the LTE communication system. Hereinafter, the LTE system will be understood to include the existing LTE system and the LTE-A system.

In the LTE-A system, the base station may configure a primary cell (PCell) and a secondary cell (SCell) for a user equipment and provide a service to the user equipment through at least two cells. This can provide a higher traffic rate to the user equipment or user. However, even if the traffic of the user equipment is below a given level, configuring an SCell to the user equipment may waste resources. Hence, a method for dynamically operating the SCell is required.

DISCLOSURE OF INVENTION

Technical Problem

Accordingly, an aspect of the present invention is to provide a method and apparatus for dynamically controlling the Scell in a mobile communication system. Another aspect of the present invention is to provide a method and apparatus for dynamically controlling the SCell in a mobile communication system supporting carrier aggregation (CA) on the basis of at least one of reception power or traffic of a user equipment.

Solution to Problem

In accordance with an aspect of the present invention, there is provided a method of configuring a secondary cell (SCell) for a base station (eNB) in a mobile communication system. The method may include: identifying the carrier aggregation (CA) operation mode; identifying the amount of traffic for a user equipment (UE); determining whether to add an SCell in the UE on the basis of the CA operation mode and the traffic amount for the UE; and transmitting an SCell addition request message to the UE according to the determination.

In accordance with another aspect of the present invention, there is provided a base station (eNB) in a mobile communication system. The base station may include: a transceiver to transmit and receive signals; and a controller to control a process of identifying the carrier aggregation (CA) operation mode, identifying the amount of traffic for a user equipment (UE), determining whether to add an SCell in the UE on the basis of the CA operation mode and the traffic amount for the UE, and transmitting an SCell addition request message to the UE according to the determination.

In accordance with another aspect of the present invention, there is provided a method of configuring a secondary cell (SCell) for a user equipment (UE). The method may include: maintaining a connection to at least one cell of a base station (eNB); receiving an SCell addition request message for the UE from the eNB; and configuring an SCell in the UE on the basis of the SCell addition request message, wherein the SCell addition request message may be determined based on the CA operation mode of the eNB and the amount of traffic for the UE.

In accordance with another aspect of the present invention, there is provided a user equipment (UE). The user equipment may include: a transceiver to transmit and receive signals; and a controller to control a process of maintaining a connection to at least one cell of a base station (eNB), receiving an SCell addition request message for the UE from the eNB, and configuring an SCell in the UE on the basis of the SCell addition request message, wherein the SCell addition request message is determined based on the CA operation mode of the eNB and the amount of traffic for the UE.

Aspects, features or objects of the present invention are not limited to those described above. Other aspects, advantages, and salient features of the present invention will become apparent to those skilled in the art from the following description.

Advantageous Effects

In a feature of the present invention, it is possible to provide an improved method and apparatus for dynamically controlling the SCell in a mobile communication system.

In another feature of the present invention, it is possible to provide a method and apparatus for dynamically controlling the SCell in a mobile communication system supporting carrier aggregation (CA) on the basis of at least one of reception power or traffic of a user equipment.

In another feature of the present invention, it is possible to provide a method of associating the mobility policy of the user equipment based on CA operation mode and the traffic-based dynamic SCell control operation.

BRIEF DESCRIPTION OF DRAWINGS

FIG. 12 illustrates operations and mode branches during handover according to an embodiment of the present invention.

MODE FOR THE INVENTION

Figure 1:
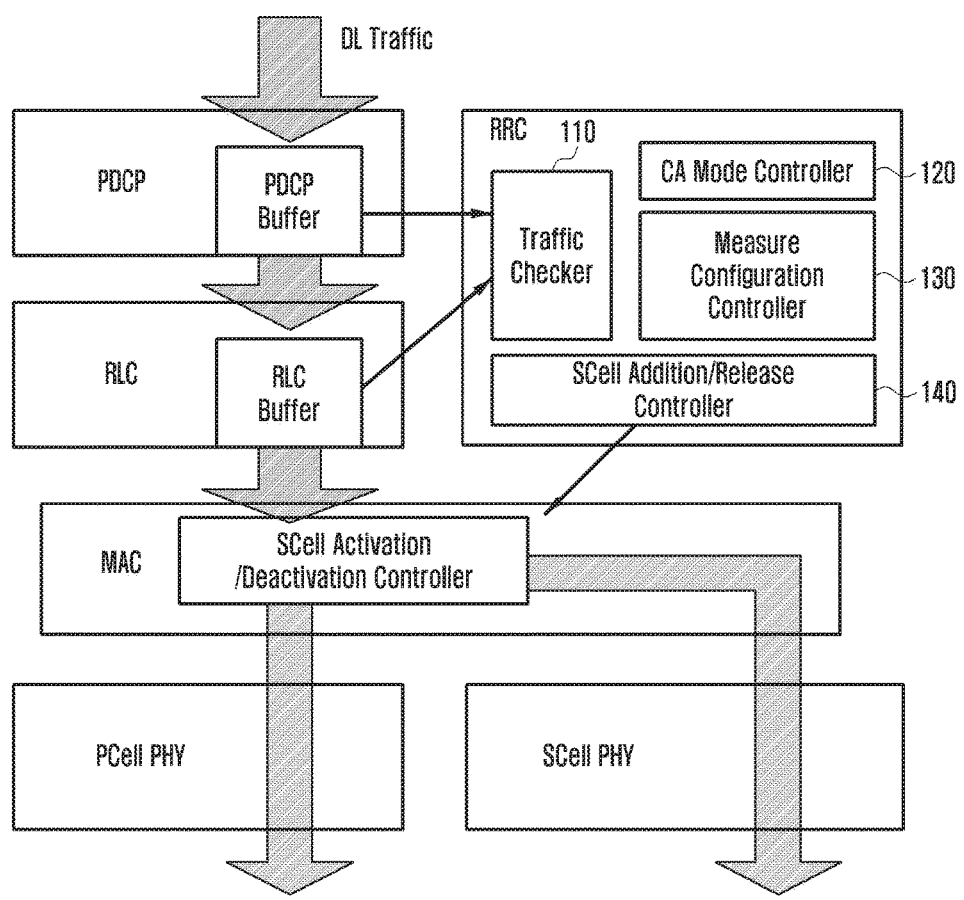
FIG. 1 illustrates radio protocols of the base station according to an embodiment of the present invention.

Hereinafter, various embodiments of the present invention are described in detail with reference to the accompanying drawings. The same or similar reference symbols are used throughout the drawings to refer to the same or like parts. Detailed descriptions of well-known functions and structures incorporated herein may be omitted. In the following description, only parts necessary for understanding the operations according to various embodiments of the present invention will be described, and descriptions of other parts may be omitted to avoid obscuring the subject matter of the present invention.

The present invention dynamically allocates and releases a secondary component carrier (SCC) according to the amount of traffic required for scheduling and the RSRx of the UE in an LTE communication system supporting carrier aggregation (CA), enabling more efficient resource management compared with existing static SCC allocation. Carrier aggregation enables the user equipment and the base station to simultaneously transmit and receive data through two or more carrier frequencies, increasing the data rate per user equipment. To utilize carrier aggregation, the following functions are provided to the base station and the user equipment.

The user equipment can simultaneously receive data through multiple frequencies, or can simultaneously transmit and receive data through multiple frequencies. The base station (eNB) can simultaneously transmit data through multiple frequencies available to the user equipment, or can simultaneously transmit and receive data through such multiple frequencies.

The base station can provide a service to a user equipment not supporting CA through a single cell with a single frequency as in the conventional case. The base station can provide simultaneous data transmission and reception services to a user equipment supporting CA through multiple cells with different carrier frequencies. That is, a CA-capable UE may have multiple serving cells.

A user equipment may attempt to access one cell among multiple simultaneously serviceable cells and establish a radio resource control (RRC) connection to the cell. Among the serving cells, one cell that maintains an RRC connection to the user equipment is referred to as the primary cell (PCell), and other cells that are aggregated additionally are referred to as secondary cells (SCells).

The base station may add or release an SCell of a CA-capable UE as needed, and may activate or deactivate the SCell after addition. Only when the SCell of the CA-capable UE is activated, the base station can schedule the UE to allocate resources to the UE in the SCell and transmit a radio frequency (RF) signal carrying data to the UE. When the SCell of the CA-capable UE is deactivated, the base station cannot schedule the UE and transmit data to the UE in the SCell. During a period when the SCell is activated, the CA-capable UE may turn on the RF receiver and modem receiver, receive a signal, and search resource allocation information from the received signal to restore the data.

On the other hand, when the SCell is disabled, the CA-capable UE may turns off the RF and modem receivers so as not to receive the SCell signal, thereby reducing power consumption. As shown in FIG. 1, since SCell activation and deactivation is performed through a control signal (control element) of the medium access control (MAC) layer, it can be rapidly processed with low signaling overhead in comparison to SCell addition and release performed by signaling of the RRC (or call processing) layer. Hence, SCell activation and deactivation can reduce power consumption by selectively turning on the RF receiver and modem of the SCell only when there is data to be transmitted depending on the amount of data for the UE.

However, since the allocation and release of physical channels of the SCell for the CA-capable UE can be performed only by signaling of the RRC layer, physical resources are consumed even when the SCell is deactivated after SCell addition. In addition, to measure the signal strength of the SCell or to rapidly acquire RF reception synchronization when the SCell is activated, the CA-capable UE periodically turns on the SCell RF and modem receivers to detect the SCell signal even when the SCell is deactivated. Hence, once the SCell is added, even when the SCell is deactivated, a certain amount of physical resources and power are consumed although the amount is smaller than when the SCell is activated.

To provide CA services in the LTE-A system, the operator forms the coverage using different frequencies. Frequency deployment scenarios selectable by the operator may be classified as shown in Table 1 below. The LTE base station supporting CA can be configured to allow the operator to easily select the CA mode suitable for the CA frequency deployment scenario through system parameter input. Triggers of SCell addition/release operations of the UE for individual CA modes are illustrated in Table 1.

TABLE 1

| | | CA Operation Mode | | |
|---|---|---|---|---|
| | | Mode 1 | Mode 2 | Mode 3 |
| CA Operation Triggers | Addition Trigger | RRC Connection Establishment to PCell | RRC Connection Establishment to PCell Event A4 with RSRx | RSRx > Threshold |
| | Release Trigger | RRC Connection Release from PCell | RRC Connection Release from PCell Event A2 with RSRx | RRC Connection Release from PCell Event A2 with RSRx |
| | Change Trigger | Handover | Handover | Handover Event A6 with RSRx |

RSRx is used as a concept that includes reference signal received power (RSRP) and reference signal received quality (RSRQ) indicating the level of received power at the UE.

The CA operation mode can be determined on the basis of the coverage and electric field of the PCell and the SCell. Mode 1 may be set if the coverage and electric field conditions of the PCell and the SCell are almost identical. Mode 2 may be set if the coverage of the PCell and the SCell is similar but the electric field conditions are unstable. Mode 3 may be set if the coverage and the electric field conditions are different since the frequency bands of the PCell and the SCell are different.

In Mode 1 and Mode 2 among CA operation modes, the SCell is added by default when the CA-capable UE is call-connected to a cell and when the CA-capable UE is handed over to a cell (traffic is not considered). Here, for SCell addition, the cell to be used as the SCell must be specified in advance by the operator. Mode 2 is based on the operation of Mode 1, but if the electric field of the SCell is not acceptable, the SCELL may be released according to a measurement report (MR) message from the UE. Later, if the electric field of the SCell becomes better, the SCell may be added again. In Mode 3, the CA-capable UE connected to a cell may be configured to measure the cell quality on the SCCs, the SCell with a good electric field may be added, and if the electric field of the SCell becomes poor, the SCell may be released. When the SCell is added, the SCell may be changed to a cell with a better electric field on the same SCC.

To allocate an SCell to one UE, it requires the same resources as PCell UE, that is, RRC-connected UE.

If the SCell addition/release trigger is limited to the mobility (handover) control timing of the PCell or the layer-3 measurement (measurement for SCell addition triggering) reported by the UE as in the existing scheme, the SCell must be added even if the eNB has no traffic to be transmitted through the SCell, and SCell resources may be occupied by these UEs. Because of such UEs that unnecessarily occupy SCell resources and do not actually activate the SCell, other CA-capable UEs that need SCell resources (i.e., having a lot of traffic to download) may not be allocated SCell resources. In addition, as described before, once the SCell is added, even when the SCell is deactivated, additional power consumption is generated in the UE in comparison to the amount of power consumed when only a single frequency is used to receive a service.

Embodiment of the present invention provide a CA-capable UE with a method and apparatus for preventing waste of SCell configuration resources due to unnecessary occupation by dynamically adding the SCell according to the operation mode and by adding the SCell only when the traffic demand exceeds a specific level and releasing the SCell resource when the traffic demand falls below the level again or disappears. Therefore, in the following embodiment, the key point of the present invention is to operate the traffic-based dynamic control of SCell configuration in conjunction with the mobility policy of the UE shown in Table 1, enhancing versatility of the dynamic control.

FIG. 1 illustrates radio protocols of the base station according to an embodiment of the present invention.

With reference to FIG. 1, the radio protocols of the LTE system include Packet Data Convergence Protocol (PDCP), Radio Link Control (RLC), and Medium Access Control (MAC) in the UE and the eNB.

The PDCP performs operations such as IP header compression/decompression, transmission of user data, sequence number maintenance for radio bearers, and encryption/decryption. According to the LTE standard, the PDCP is responsible for ciphering/deciphering packets.

The RLC reconfigures PDCP PDUs (packet data unit) to a suitable size. The MAC forms connections between multiple RLC layer entities in the UE. The MAC multiplexes RLC PDUs into MAC PDUs and demultiplexes MAC PDUs into RLC PDUs.

The physical layer converts higher layer data into OFDM symbols by means of channel coding and modulation and transmits the OFDM symbols through a wireless channel. The physical layer converts OFDM symbols received through a wireless channel into higher layer data by means of demodulation and channel decoding and forwards the data to higher layers.

In an embodiment of the present invention, a device, software program, or unit may be included in the radio resource control (RRC) block. For example, the RRC block may include a traffic checker 110, a CA mode controller 120, a measurement configuration controller 130, and an SCell addition/release controller 140.

The traffic checker 110 may identify the amount of downlink traffic of the CA-capable UE being currently served on the basis of the traffic buffers of the PDCP and RLC layers. The CA mode controller 120 may identify the mode of the corresponding cell and control SCell addition and measurement according to the mode. The measurement configuration controller 130 may control measurement configurations in the UE. The SCell addition/release controller 140 may control the CA-capable UE to add or release an SCell according to a specific event or an initial configuration procedure. The embodiment of the present invention provides a method and apparatus that enable the CA-capable UE to efficiently perform configuration and measurement operations on SCell addition/release on the basis of the traffic measured by the traffic checker 110, the CA mode identified by the CA mode controller 120, or a combination thereof.

In FIG. 1, the RRC layer is described as being divided into plural blocks. However, the configuration of the base station is not limited thereto. For example, in one embodiment of the present invention, the eNB may include at least one processor or controller that carries out the functions of the traffic checker 110, CA mode controller 120, measurement configuration controller 130, and SCell addition/release controller 140.

First, in an embodiment of the present invention, the following situation is assumed. It is possible to enable or disable (on or off) the proposed scheme of dynamic SCell configuration based on the traffic and operation mode. In addition, when the scheme of dynamic SCell configuration based on the traffic and operation mode is disabled, it can operate in the same manner as the existing SCell addition/release procedure.

Concerning operations of the base station,

When a UE is connected due to attachment or handover, upon determining that the UE is CA-capable on the basis of UE capability information of the UE, the RRC block notifies this to the MAC/RLC block.

The MAC/RLC block may determine when SCell addition is needed on the basis of the downlink time-varying traffic buffer occupancy of a UE that is not configured with an SCell in the CA-capable SCC among CA-capable UEs.

The MAC/RLC block may determine when SCell release is needed on the basis of the downlink time-varying traffic buffer occupancy of a SCell added UE.

The algorithm for determining the timing of SCell addition and SCell release is based on the MAC/RLC block design (the algorithms for SCell addition and SCell release does not have to be symmetric).

For future optimization, threshold values necessary for the algorithm for condition checking can be provided as system parameters.

The MAC/RLC block can send a preset message to the RRC block immediately after determining that SCell addition is necessary (specification on the interface between RLC and RRC).

The RRC block manages the traffic condition enable/disable state from the MAC/RLC block.

The RRC block performs SCell addition/release according to the CA operation mode and the SCell configuration state based on the traffic condition enable/disable state and the event reception time.

For the periodic MR used in smart scheduling, the measurement object including the black list is not changed when an inter-frequency carrier search trigger event A2/A1 MR is received.

* That is, in the operation where this specification is applied, MRs triggered by neighbor cells that cannot be co-scheduled should be borne.

Concerning handover,

When the traffic-based SCell addition/release function is enabled (on), upon handover, an attempt is made to maintain the SCell configuration state of the source PCell at the target PCell.

When the traffic-based SCell addition/release function is enabled (on), the traffic-based SCell addition/release function is not performed for a given time interval immediately after completing handover.

Concerning conditions on traffic,

The eNB may monitor traffic conditions of a UE that is connected only when the traffic-based SCell addition/release flag is "on".

The eNB can start the initial traffic condition with "disable" at the time of RRC connection establishment or RRE.

At the time of handover, the initial traffic condition of the target cell can be started with "enable" when at least one SCell has been added in the source cell, or with "disable" when no SCell has been added in the source cell (according to the SCell addition status of the source cell).

The eNB activates the traffic disregard timer at the time of RRC connection establishment or RRE, or immediately after reception of a HO request and immediately before transmission of an RRC connection reconfiguration message.

The traffic disregard timer is a per-cell system parameter, and may be set to different values for RRC connection establishment, RRE, and handover. The traffic state cannot be transitioned until this timer expires.

After the traffic disregard timer expires, a traffic state transition is possible. A state transition immediately after expiration of the timer may be considered an event.

Figure 2:
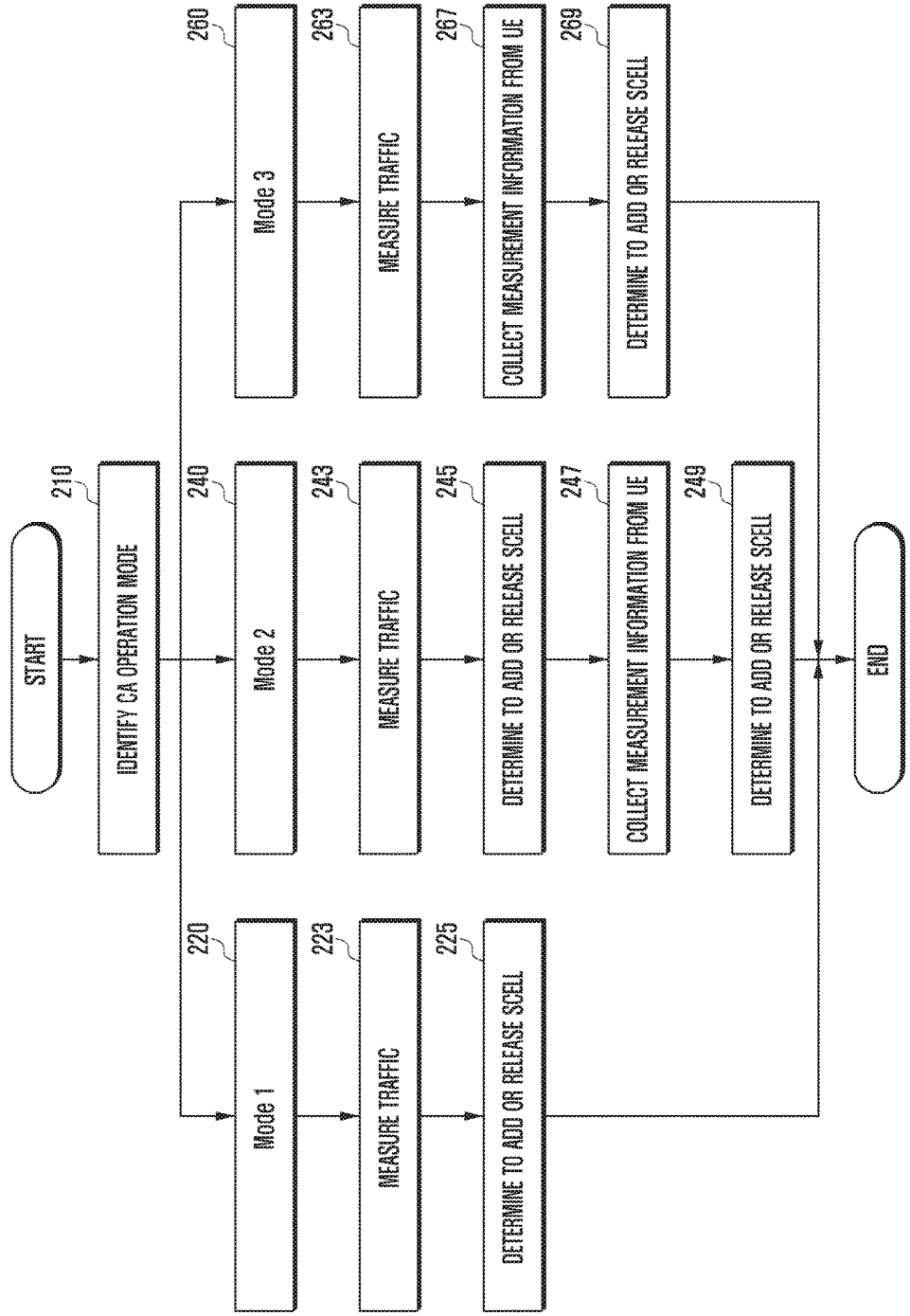
FIG. 2 illustrates operations of the base station according to an embodiment of the present invention.
Figure 3:
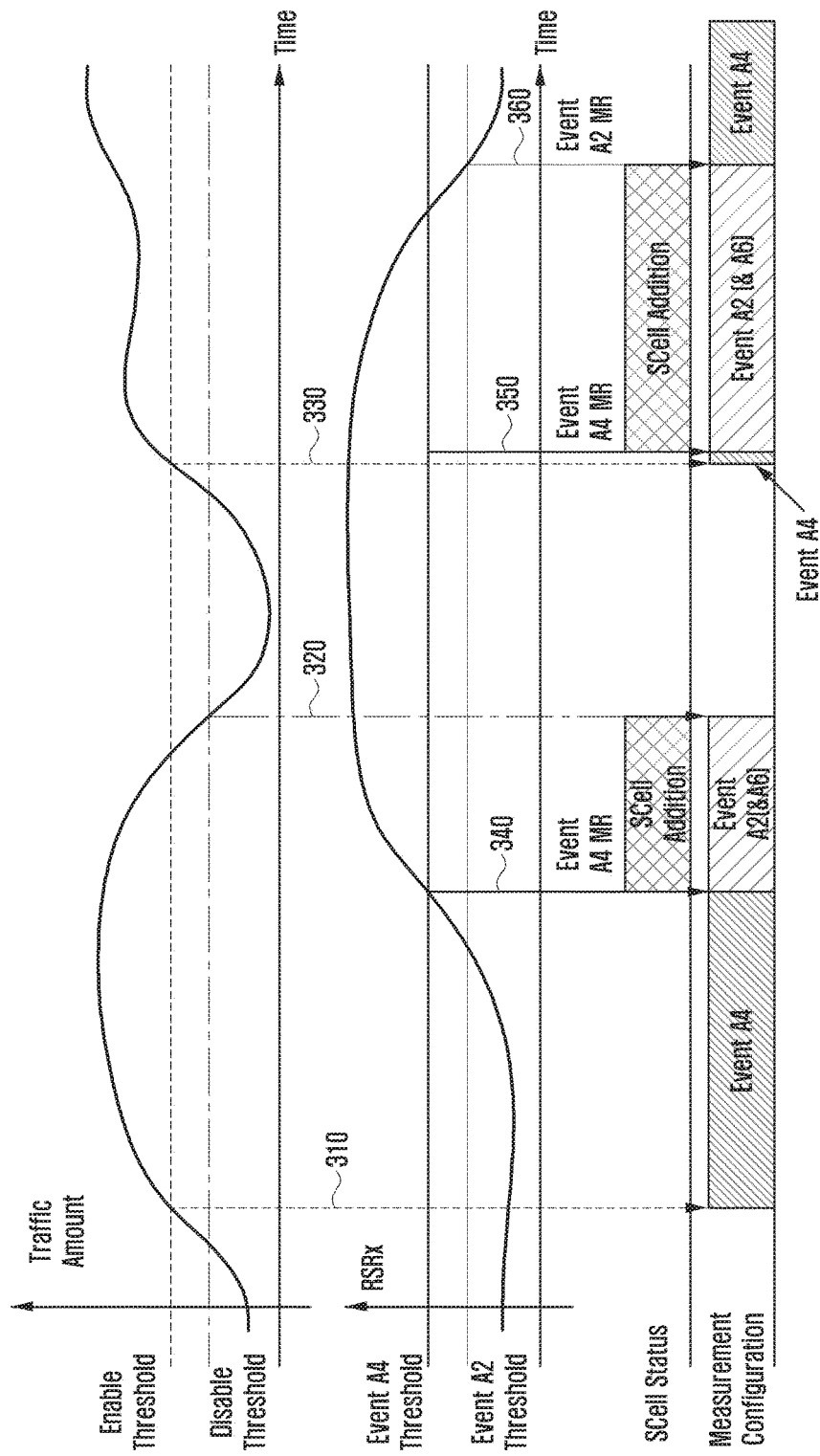
FIG. 3 illustrates SCell addition and release based on the amount of traffic and measurement results according to an embodiment of the present invention.

FIG. 2 illustrates eNB operations according to an embodiment of the present invention. FIG. 3 illustrates SCell addition and release based on the amount of traffic and measurement results according to an embodiment of the present invention.

With reference to FIGS. 2 and 3, at operation 210, the eNB may identify the CA operation mode. The CA operation mode of the eNB may be Mode 1, Mode 2, and Mode 3 as illustrated in Table 1. Refer to Table 1 for a detailed description of each mode.

If the CA operation mode is Mode 1, Mode 2, or Mode 3, the procedure proceeds to operation 220, operation 240, or operation 260. In one embodiment of the present invention, the eNB may use additional modes other than the above three modes, or may use only two of the above three modes.

At operation 223 (Mode 1), the eNB may measure traffic for the UE. The eNB may measure the amount or level of traffic. For example, the eNB may measure the traffic for the UE stored in the PDCP buffer of the PDCP layer or in the RLC buffer of the RLC layer.

At operation 225, the eNB may determine whether to add or release an SCell on the basis of the amount of traffic for the UE. In Mode 1, the eNB may determine whether to add or release an SCell according to the amount of traffic for the UE.

When no SCell is configured in the UE, the eNB may determine to add an SCell if the traffic for the UE is greater than or equal to a first threshold (reference traffic value for SCell addition). The eNB may transmit an SCell addition request message to the UE, and the UE receiving the SCell addition request message can add an SCell. If the traffic is less than the first threshold, the eNB does not send an SCell addition request to the UE.

When an SCell is configured in the UE, the eNB may determine to release an SCell if the traffic for the UE is less than or equal to a second threshold (reference traffic value for SCell release). The eNB may transmit an SCell release request message to the UE, and the UE receiving the SCell release request message can release the configured SCell. If the traffic is greater than or equal to the second threshold, the eNB does not send an SCell release request to the UE.

In FIG. 3, refer to points indicated by indicia 310, 320, and 330. In Mode 1, the eNB may dynamically perform SCell addition and release according to the amount of traffic. When the traffic becomes above the first threshold (enable threshold) at point 310, the eNB may control the UE to add an SCell. After an SCell is added to the UE, when the traffic reaches the second threshold (disable threshold) at point 320, the eNB can control the UE to release the SCell. Thereafter, when the traffic again becomes greater than or equal to the first threshold at point 330, the eNB can control the UE to add an SCell.

At operation 243 (Mode 2), the eNB may measure traffic for the UE.

At operation 245, the eNB may determine whether to add or release an SCell on the basis of the amount of traffic for the UE. In Mode 2, the eNB may determine whether to add or release an SCell according to the amount of traffic for the UE. Mode 2 differs in that the decision to add or release an SCell is based not only on the traffic but also on the measurement report from the UE. The measurement report of the UE includes RSRx (including at least one of RSRP and RSRQ).

At operation 245, if no SCell is configured in the UE, after configuring the PCell, the eNB may add an SCell if the traffic for the UE is greater than or equal to the first threshold. The eNB may release the SCell if the traffic for the UE is less than the second threshold.

If no SCell is configured in the UE owing to release after SCell configuration, at operation 247, the eNB may collect a measurement report from the UE. At operation 249, the eNB may determine whether to add an SCell on the basis of the traffic and the measurement information. The eNB may determine to add an SCell if the level of RSRx is greater than or equal to a preset third threshold (reference power value for SCell addition) in the measurement information and the traffic is greater than or equal to the first threshold. The eNB may transmit an SCell addition request message to the UE, and the UE receiving this message can add an SCell. The eNB does not add an SCell unless the traffic is greater than or equal to the first threshold and RSRx is greater than or equal to the third threshold.

If an SCell is configured in the UE, at operation 247, the eNB may collect a measurement report from the UE. At operation 249, the eNB may determine whether to release the SCell on the basis of the traffic and the measurement information. The eNB may determine to release the SCell if the level of RSRx in the measurement information is less than a fourth threshold (reference power value for SCell release) or the traffic is less than the second threshold (inclusive or). The eNB may transmit an SCell release request message to the UE, and the UE receiving this message may release the SCell.

In FIG. 3, refer to points indicated by indicia 310, 320, 330, 340, 350 and 360. In Mode 2, the eNB may dynamically perform SCell addition and release according to the amount of traffic and measurement information from the UE. When the traffic becomes above the first threshold (enable threshold) at point 310, the eNB may control the UE to add an SCell. After an SCell is added to the UE, when the traffic reaches the second threshold (disable threshold) at point 320, the eNB may control the UE to release the SCell.

Thereafter, when the traffic again becomes greater than or equal to the first threshold at point 330, the eNB may request the UE to send measurement information. If the measurement information is greater than or equal to the third threshold, the eNB may configure the UE to report measurement information (event A4). If the received power level of the measurement information exceeds the third threshold (event A4 threshold), the UE may report the measurement information to the eNB. Upon reception of the measurement information, the eNB may determine that event A4 has occurred, and determine that the received power level is greater than or equal to the third threshold. The eNB may receive the measurement report at point 350. The eNB may add an SCell at point 350 since the traffic is greater than or equal to the first threshold and the measurement information is greater than or equal to the third threshold.

After SCell addition, the eNB may configure the UE to send a measurement report (event A2 and/or event A6) if the measurement information of the UE is less than a preset fourth threshold. At point 360, the traffic of the UE is greater than or equal to the first threshold, but the measurement information of the UE is less than the fourth threshold. Hence, the UE may send a measurement result to the eNB at point 360. Upon reception of the measurement result, the eNB may be aware that the measurement information of the UE is less than the fourth threshold. The eNB may determine to release the SCell configured in the UE. The eNB may transmit an SCell release request message to the UE. In addition, as the current traffic of the UE is greater than or equal to the first threshold, the eNB may configure the UE with event A4. Thereafter, as the received power level becomes acceptable, when the UE sends the eNB a measurement result according to event A4, the eNB may again add an SCell in the UE.

At operation 263 (Mode 3), the eNB may measure traffic for the UE.

At operation 265, the eNB may determine whether to add or release an SCell on the basis of the amount of traffic for the UE. In Mode 3, the eNB may determine whether to add or release an SCell on the basis of the amount of traffic and the measurement information of the UE. In Mode 3, an SCell is not added immediately after PCell configuration, but it may be added if the conditions for traffic and measurement information are satisfied. For SCell release, similarly to Mode 2, the SCell can be released if one of the conditions for traffic and measurement information is satisfied. The measurement information from the UE includes RSRx (including at least one of RSRP and RSRQ).

At operation 267, the eNB may collect measurement information from the UE. The eNB may send the UE a request for measurement information, and may receive measurement information corresponding to the request. The eNB may pre-configure the UE to report measurement information when a specific event occurs in the UE. For example, the eNB may configure the UE to report measurement information when event A2, A4 or A6 occurs in the UE.

If no SCell is configured in the UE, at operation 269, the eNB may determine whether to add an SCell on the basis of the traffic and the measurement information. The eNB may determine to add an SCell if the RSRx level of the measurement information is greater than or equal to the third threshold (reference power value for SCell addition) and the traffic is greater than or equal to the first threshold. The eNB may transmit an S Cell addition request message to the UE, and the UE receiving this message can add an SCell. The eNB does not add an SCell unless the traffic is greater than or equal to the first threshold and the RSRx level is greater than or equal to the third threshold.

If an SCell is configured in the UE, at operation 267, the eNB may collect measurement information from the UE. At operation 269, the eNB may determine whether to release the SCell on the basis of the traffic and the measurement information. The eNB may determine to release the SCell if the RSRx level of the measurement information is less than the fourth threshold (reference power value for SCell release) or the traffic is less than the second threshold (inclusive or). The eNB may transmit an SCell release request message to the UE, and the UE receiving this message may release the SCell.

In FIG. 3, refer to points indicated by indicia 310, 320, 330, 340, 350 and 360. In Mode 3, the eNB may dynamically perform SCell addition and release according to the amount of traffic and measurement information from the UE. At point 310 where the traffic becomes greater than or equal to the first threshold (enable threshold), the eNB does not add an SCell since the measurement information of the UE is not greater than or equal to the third threshold (event A4 threshold). However, the eNB may configure the UE with event A4 at point 310.

At point 340, as the measurement information is greater than or equal to the third threshold, the UE may report the measurement information to the eNB. Upon reception of the measurement information, the eNB may determine that event A4 has occurred, and determine that the received power level is greater than or equal to the third threshold. The eNB may determine to add an SCell at point 340 since the conditions for traffic and measurement information are satisfied. Additionally at point 340, the eNB may configure the UE to send a measurement report (event A2 and/or event A6) if measurement information of the UE is less than the fourth threshold.

After an SCell is added in the UE, when the traffic reaches the second threshold (disable threshold) at point 320, the eNB may control the UE to release the SCell. The eNB may deregister event A2 and/or event A6 configured in the UE.

Thereafter, when the traffic again becomes greater than or equal to the first threshold at point 330, the eNB may request the UE to send a measurement report (event A4 registration). The eNB may configure the UE to report measurement information if the measurement information is greater than or equal to the third threshold (event A4). If the received power level of the measurement information exceeds the third threshold (event A4 threshold), the UE may report the measurement information to the eNB. Upon reception of the measurement information, the eNB may determine that event A4 has occurred, and determine that the received power level is greater than or equal to the third threshold. The eNB may receive the measurement report at point 350. The eNB may add an SCell at point 350 since the traffic is greater than or equal to the first threshold and the measurement information is greater than or equal to the third threshold.

After SCell addition, the eNB may configure the UE to send a measurement report (event A2 and/or event A6) if the measurement information is less than the fourth threshold. At point 360, the traffic of the UE is greater than or equal to the first threshold, but the measurement information of the UE is less than the fourth threshold. Hence, the UE may send a measurement result to the eNB at point 360. Upon reception of the measurement result, the eNB may be aware that the measurement information of the UE is less than the fourth threshold. The eNB may determine to release the SCell configured in the UE. The eNB may transmit an SCell release request message to the UE. In addition, as the current traffic of the UE is greater than or equal to the first threshold, the eNB may configure the UE with event A4. Thereafter, as the received power level becomes acceptable, when the UE sends the eNB a measurement result according to event A4, the eNB may again add an SCell in the UE.

As described above, in an embodiment of the present invention, the SCell can be dynamically added or released on the basis of the CA operation mode, the amount of traffic, and the measurement information of the UE.

Figure 4:
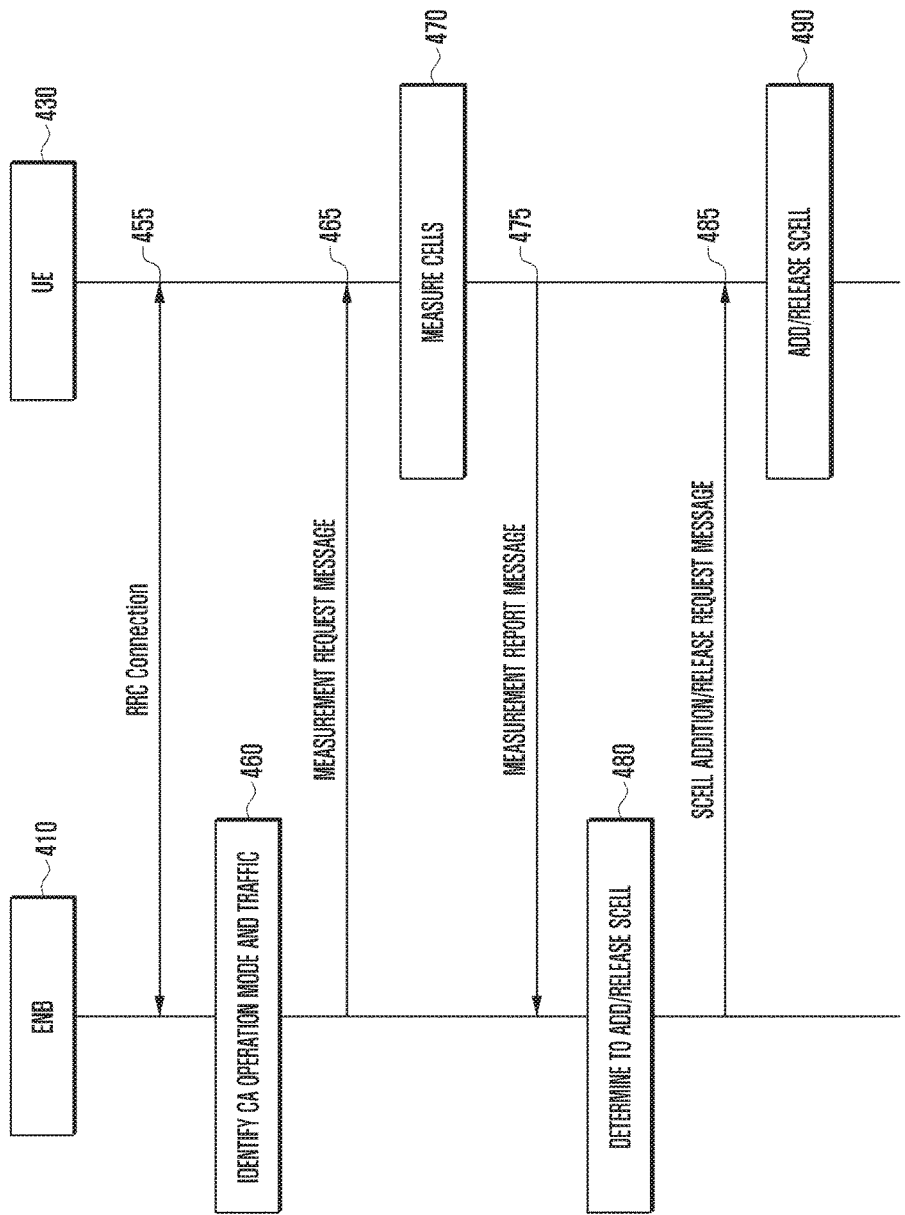
FIG. 4 illustrates dynamic SCell configuration in the base station and user equipment according to an embodiment of the present invention.

FIG. 4 illustrates dynamic SCell configuration in the base station and user equipment according to an embodiment of the present invention.

In FIG. 4, at operation 455, it is assumed that the eNB 410 and the UE 430 are in RRC-connected state. In RRC-connected state, the PCell is configured in the UE 430. An SCell may or may not be configured in the UE 430. An SCell can be added, or an already configured SCell can be released according to subsequent operations.

At operation 460, the eNB 410 may identify the operation mode. In addition, the eNB 410 may measure the amount of traffic for the UE 430. For example, the eNB 410 may measure the traffic for the UE 430 stored in the PDCP buffer of the PDCP layer or in the RLC buffer of the RLC layer. Identifying the operation mode and measuring the amount of traffic may be performed at different operations. The operation mode can be identified as one of operation modes described in Table 1.

In Mode 1, the eNB 410 may add or release an SCell on the basis of traffic as described in connection with FIGS. 2 and 3. Hence, in Mode 1, operations 465, 470 and 475 may be skipped. However, the eNB 410 may send a measurement request message for a purpose other than dynamic SCell control. At operation 480, the eNB 410 may determine whether to add or release an SCell on the basis of the identified traffic. The eNB 410 may determine to add an SCell if the traffic amount is greater than or equal to the first threshold. Additionally, the eNB 410 may determine to release an SCell if the traffic amount is less than the second threshold. At operation 485, the eNB may transmit an SCell addition request message or SCell release request message to the UE 430. At operation 490, the UE 430 may add or release an SCell according to the SCell addition request message or SCell release request message from the eNB 410.

In Mode 2 or Mode 3, the eNB 410 may dynamically control the SCell on the basis of the traffic and measurement information from the UE 430. At operation 465, the eNB 410 may transmit a measurement request message to the UE according to the SCell configuration status. The measurement request message may be an event A2, A4, A6 registration message. Refer to the description on FIG. 2 and FIG. 3 for each message. At operation 470, the UE 430 may perform measurements on the SCell. The UE 430 may perform measurements on the SCell corresponding to the PCell and SCell candidates. At operation 475, the UE 430 may transmit a measurement report message in response to the measurement request message from the eNB 410. The UE 430 may transmit a measurement report message when the measured value for the SCell is greater than or equal to the third threshold or is less than the fourth threshold depending upon the registered event. Refer to the description on FIG. 2 and FIG. 3 for detailed operations. At operation 480, the eNB 410 may determine whether to add or release an SCell on the basis of the measurement report message received from the UE 430. Additionally, the eNB 410 may utilize traffic information at the time of receiving the measurement report message. The eNB 410 may determine to add an SCell if the traffic amount is greater than or equal to the first threshold and the measurement value in the measurement report message is greater than or equal to the third threshold. The eNB 410 may determine to release a configured SCell if the traffic amount is less than the second threshold and the measurement value in the measurement report message is less than the fourth threshold. At operation 485, the eNB 410 may transmit an SCell addition request message or SCell release request message to the UE 430 according to the determination result about SCell addition or release. At operation 490, the UE 430 may add or release an SCell according to the SCell addition request message or SCell release request message from the eNB 410. Meanwhile, as described in connection with FIGS. 2 and 3, overall operations in Mode 2 and Mode 3 are similar. However, in Mode 2, an SCell is immediately added when the PCell is configured, and then the SCell is dynamically configured in consideration of measurement information from the UE. On the other hand, in Mode 3, even when the PCell is initially configured, measurement information from the UE is considered before SCell addition without immediately adding an SCell.

In the embodiment of FIGS. 2 to 4, a description is given of a method for dynamically configuring the SCell on the basis of the CA operation mode, traffic, and measurement information. In an embodiment of the present invention, it is also possible to select at least two conditions from the above conditions. That is, it is possible to dynamically add or release an SCell only on the basis of the traffic for each CA operation mode. In this case, among the operations for each mode described with reference to FIGS. 2 to 4, it is possible to consider only operations related to the conditions for the traffic without consideration of the conditions for measurement information. It is also possible to dynamically add or release an SCell only on the basis of the measurement information from the UE for each CA operation mode. In this case, among the operations for each mode described with reference to FIGS. 2 to 4, it is possible to consider only operations related to the conditions for the measurement information without consideration of the conditions for the traffic.

Next, a description is given of detailed operations according to an embodiment of the present invention. Meanwhile, at least one operation of each mode described below may be included in the operations of the mode described with reference to FIGS. 2 to 4.

Figure 5:
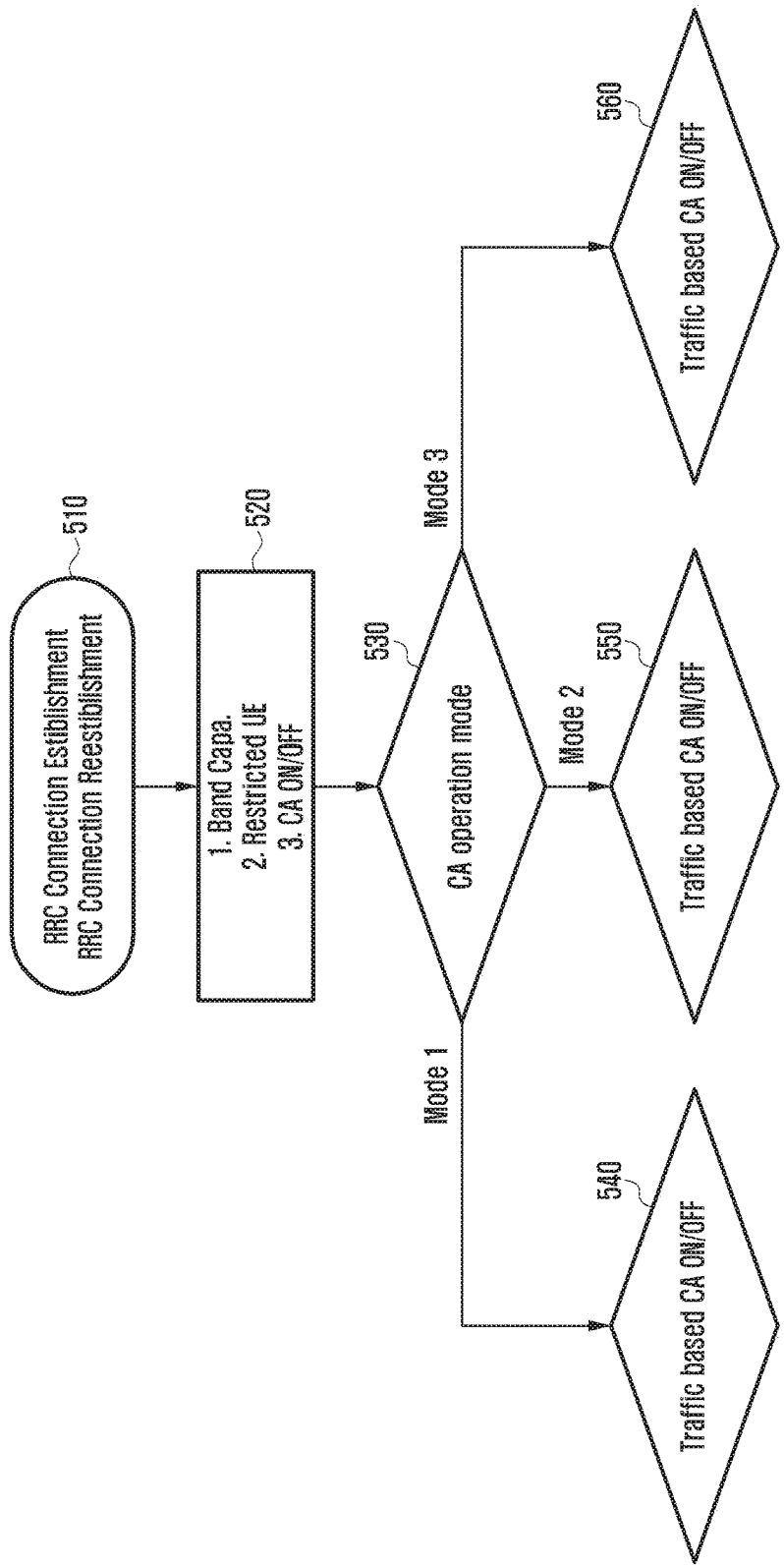
FIG. 5 illustrates operations and mode branches during RRC connection establishment according to an embodiment of the present invention.

FIG. 5 illustrates operations and mode branches during RRC connection establishment according to an embodiment of the present invention.

In FIG. 5, when RRC connection establishment or RRC connection reestablishment is performed at operation 510, the subsequent operations may be performed.

At operation 520, the eNB identifies the capability of the UE. The eNB may determine whether the UE capability IE of the UE satisfies a CA band combination. Here, the UE should not be a restricted UE designated by a core node (CN). In addition, the CA on/off flag of the PCell for the UE should be "on".

At operation 530, the eNB identifies the mode of the UE. The procedure proceeds to operation 540, operation 550, or operation 560 if the mode is Mode 1, Mode 2, or Mode 3.

Operation 540 and subsequent operations are described with reference to FIGS. 6 and 7; operation 550 and subsequent operations are described with reference to FIGS. 8 and 9; and operation 560 and subsequent operations are described with reference to FIGS. 10 and 11.

Figure 6:
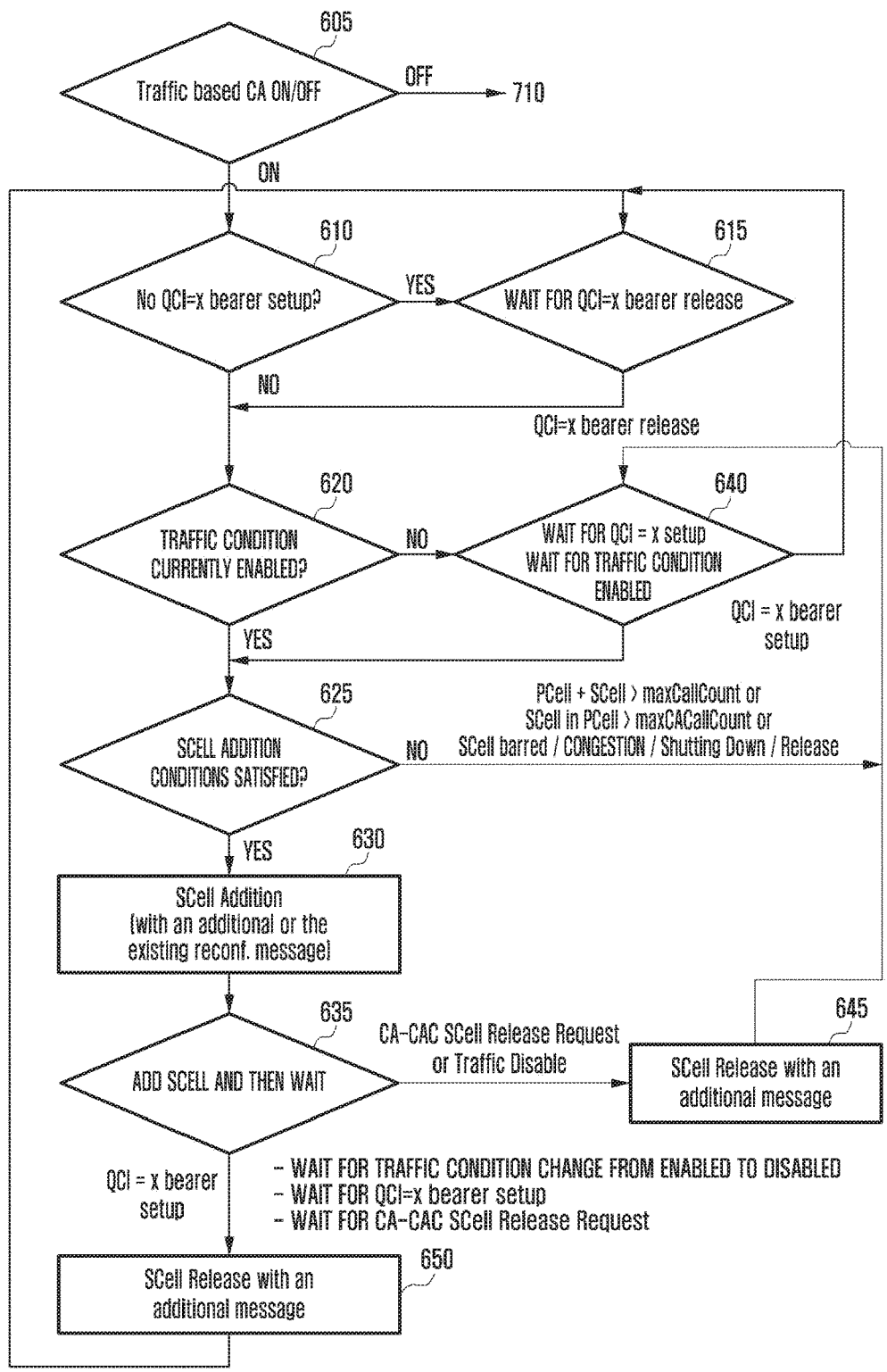
FIG. 6 illustrates SCell configuration in Mode 1 during traffic-based CA activation according to an embodiment of the present invention.
Figure 7:
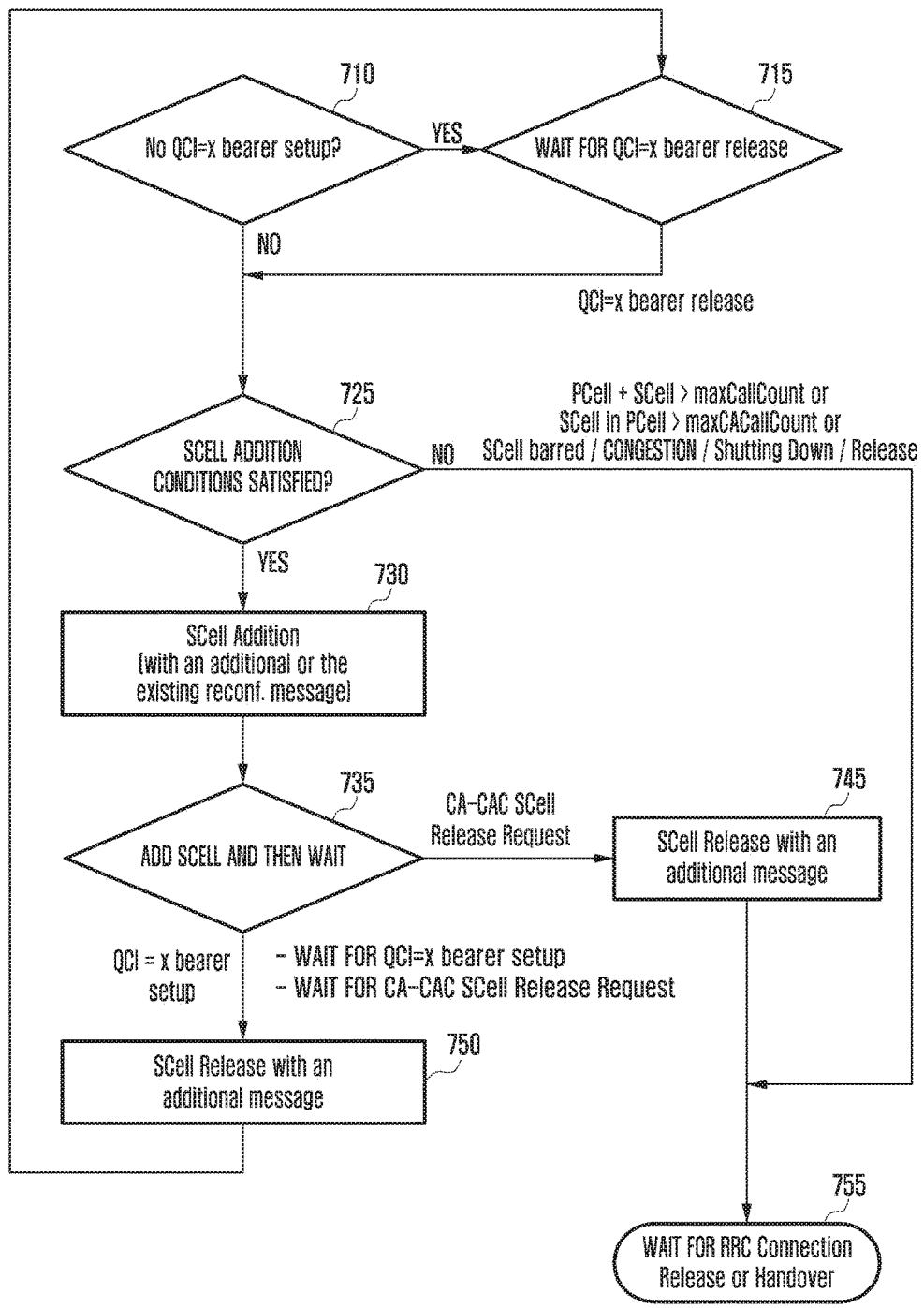
FIG. 7 illustrates SCell configuration in Mode 1 during traffic-based CA deactivation according to an embodiment of the present invention.

FIG. 6 illustrates operations for traffic-based CA activation in Mode 1, and FIG. 7 illustrates operations for traffic-based CA deactivation in Mode 1.

With reference to FIG. 6, at operation 605, the eNB checks whether traffic-based CA is activated. The eNB may examine the traffic-based CA flag. If traffic-based CA is activated, the procedure proceeds to operation 610. If traffic-based CA is deactivated, the eNB follows the procedure of FIG. 7.

At operation 610, the eNB starts to monitor the traffic condition. The eNB may examine whether a restricted QCI (QoS class identifier) bearer is set up. The restricted QCI bearer may be bearer x. If bearer x is set up, the procedure proceeds to operation 615 at which the eNB waits for release of bearer x. If bearer x is not set up, the procedure proceeds to operation 620. At operation 620, the eNB may determine whether the traffic condition is currently enabled. For example, the eNB may check whether the traffic is greater than or equal to the first threshold (reference traffic value for SCell addition). If the traffic condition is enabled, the procedure proceeds to operation 625 at which the eNB may check whether other conditions for SCell addition are satisfied. Other conditions for SCell addition are described later. If the conditions for SCell addition are satisfied, the procedure proceeds to operation 630 at which the eNB adds an SCell. When an SCell is added, the SCell paired with the PCell may be added. In Mode 1, each SCell is paired in advance with the corresponding PCell. Hence, an SCell may be added without separately using an RRC connection reconfiguration message. After SCell addition, the procedure proceeds to operation 635 at which the eNB waits.

If not all the conditions for SCell addition are satisfied at operation 625, the procedure proceeds to operation 640. At operation 640, the eNB may wait until the traffic condition becomes enabled or a restricted QCI bearer is set up. Also, if the traffic condition is not enabled at operation 620, the procedure proceeds to operation 640, at which the eNB may wait until the traffic condition becomes enabled or a restricted QCI bearer is set up. Meanwhile, if a restricted QCI bearer is set up at operation 640, the eNB may wait until all restricted QCI bearers are released. Here, the eNB may wait at operation 615. If the traffic condition becomes enabled, the procedure proceeds to operation 625.

Additionally, if the restricted QCI bearer is released at operation 615, the procedure proceeds to operation 620 at which the eNB checks whether the traffic condition becomes enabled. Other operations below are the same as those described above.

When a CA-CAC SCell release request is received or the traffic condition becomes disabled at operation 635, the procedure proceeds to operation 645. At operation 645, the eNB may release a requested SCell, and the procedure returns to operation 640. When a restricted QCI bearer is set up at operation 635, the procedure proceeds to operation 650. At operation 650, the eNB may release a requested SCell, and the procedure returns to operation 615.

If the traffic-based flag is set to "off" at operation 605 of FIG. 6, the procedure proceeds to operation 710 of FIG. 7. At operation 710, the eNB may examine whether a restricted QCI bearer is set up. If a restricted QCI bearer is set up, the procedure proceeds to operation 715. At operation 715, the eNB waits until all restricted QCI bearers are released. If no restricted QCI bearer is set up at operation 710, the procedure proceeds to operation 725.

At operation 725, the eNB checks whether the conditions for SCell addition are satisfied. If the conditions for SCell addition are satisfied, the procedure proceeds to operation 730. At operation 730, the eNB may add a paired SCell. Here, a separate RRC connection reconfiguration message may be not used. Thereafter, the procedure proceeds to operation 735. At operation 735, the eNB may add an SCell and wait. If the conditions for SCell addition are not satisfied, the procedure proceeds to operation 755. The eNB does not take any action with respect to the SCell until the corresponding call is released. Operation 735 corresponds to operation 635; operation 745 corresponds to operation 645; and operation 750 corresponds to operation 650. Refer to the description of FIG. 6 for the corresponding operations.

In one embodiment of the present invention, when a bearer with QCI=x is released, the opportunity for SCell addition is given once more regardless of SCell addition before bearer setup with QCI=x. Here, 'x' is a system parameter of bit array type, and it can prohibit SCell addition for multiple QCI bearer types.

In addition, in one embodiment of the present invention, the conditions for SCell addition (e.g., the condition checked at operation 625) are as follows.

When a cell having received an SCell addition request accepts the request, the sum of the number of UEs using the cell as the PCell and the number of UEs using the cell as an SCell should be less than or equal to maxCallCount.

The PCell and SCell should not be in a state of cell barred and congestion control.

When the SCell addition request is accepted, the number of UEs using SCells configurable in the PCell should be less than or equal to maxCACallCount.

The SCell should not be in a state of being shut down or being released.

Figure 8A:
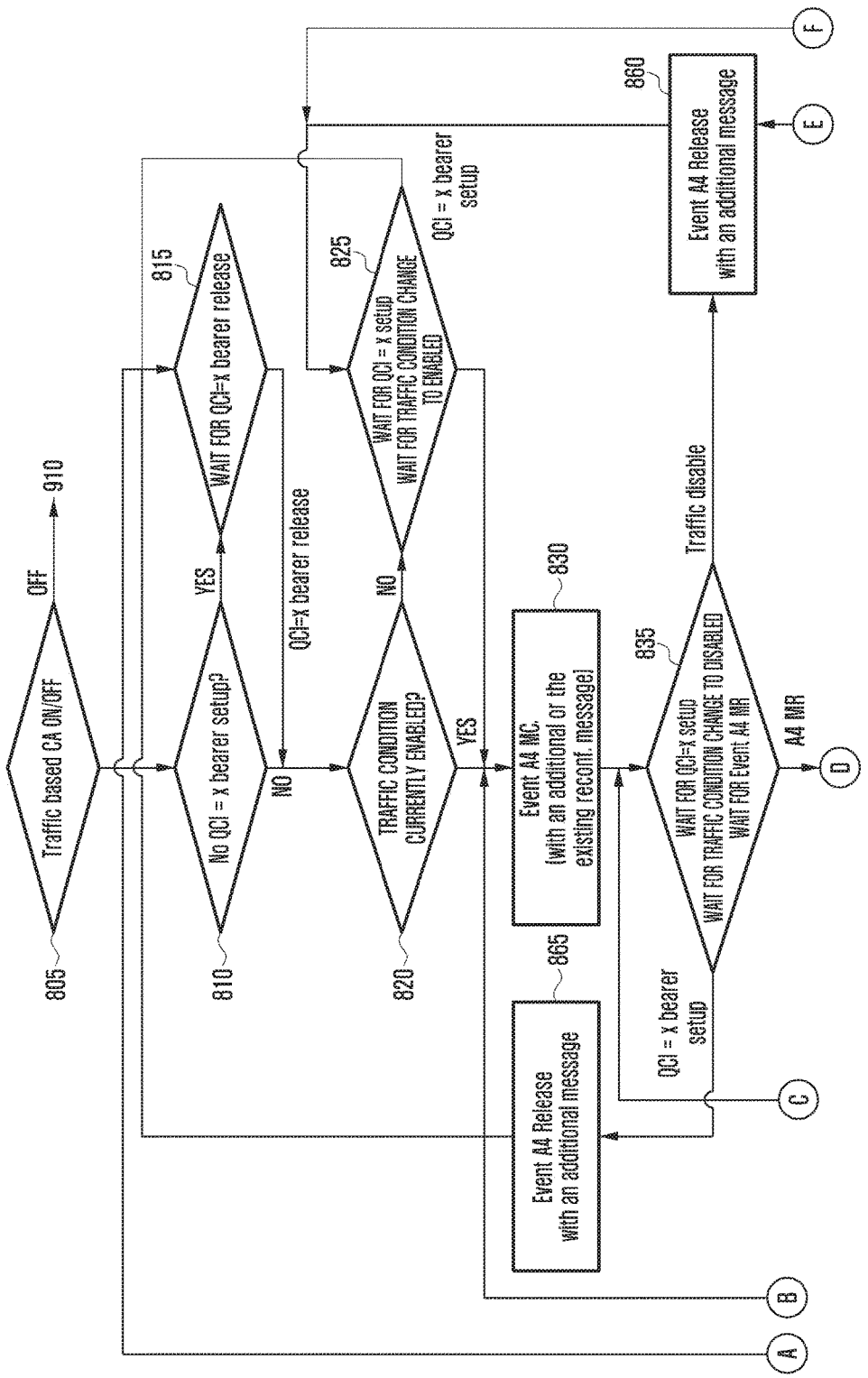
FIG. 8 illustrates SCell configuration in Mode 2 during traffic-based CA activation according to an embodiment of the present invention.
Figure 8B:
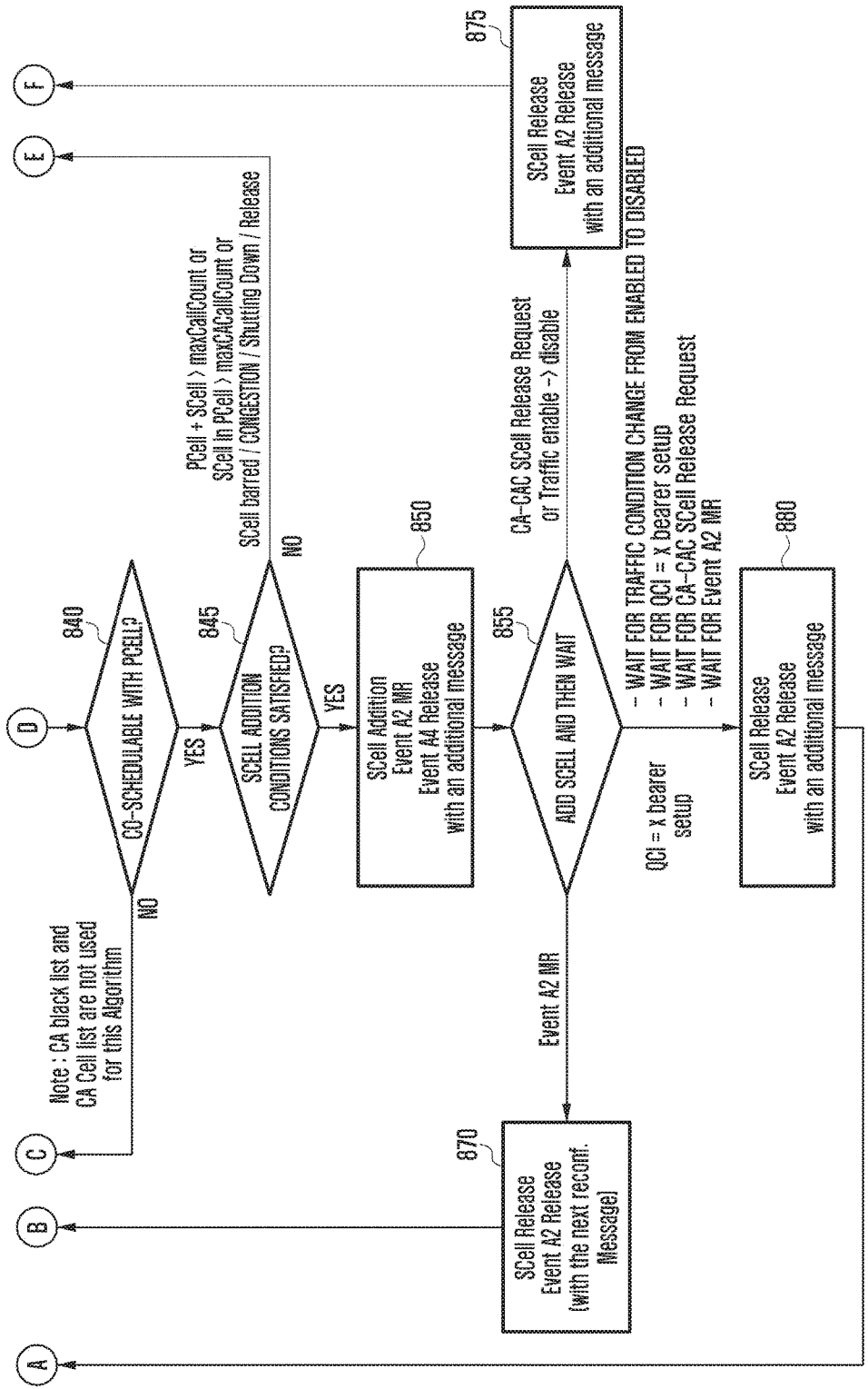
Figure 9A:
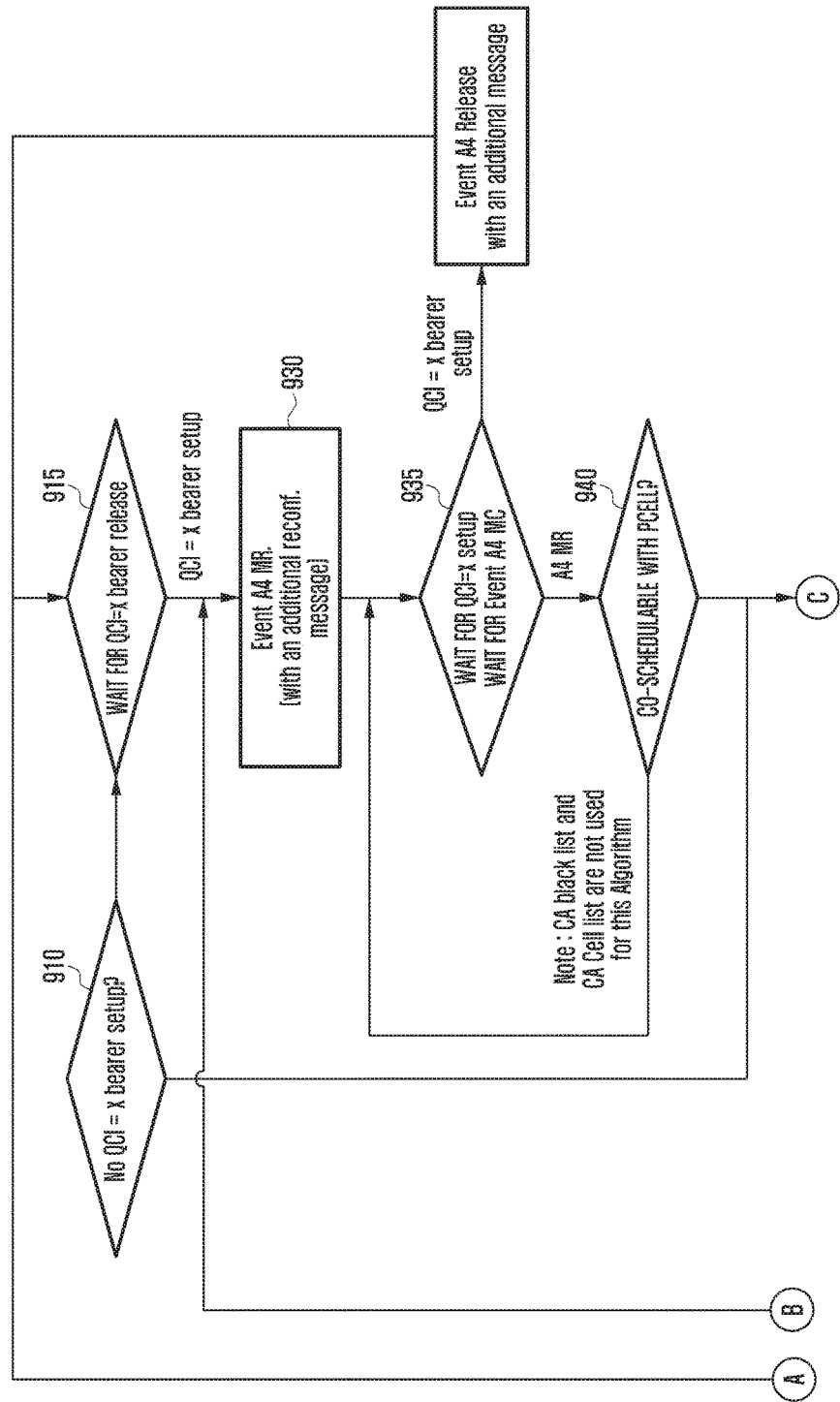
FIG. 9 illustrates SCell configuration in Mode 2 during traffic-based CA deactivation according to an embodiment of the present invention.

FIG. 8 illustrates operations for traffic-based CA activation in Mode 2, and FIG. 9 illustrates operations for traffic-based CA deactivation in Mode 2.

If the mode is identified as Mode 2 in FIG. 5, the eNB follows the procedure of FIGS. 8 and 9. In FIG. 8, at operation 805, the eNB may examine the traffic-based CA flag. If the traffic-based CA flag is set to "on", the eNB starts to monitor the traffic condition. At operation 810, the eNB may examine whether a restricted QCI bearer is set up. If a restricted QCI bearer is set up, the procedure proceeds to operation 815. At operation 815, the eNB waits until all restricted QCI bearers are released. If a restricted QCI bearer is not set up at operation 810, the procedure proceeds to operation 820.

At operation 820, the eNB may check the traffic status. The eNB may determine whether the traffic condition is currently enabled. If the traffic condition is disabled, the procedure proceeds to operation 825. At operation 825, the eNB may wait until the traffic condition becomes enabled or a restricted QCI bearer is set up. If the traffic condition becomes enabled at operation 820, the procedure proceeds to operation 830. At operation 830, the eNB may register an SCell addition trigger event. This event may be event A4 for SCell addition triggering.

The procedure proceeds from operation 830 to operation 835. At operation 835, the eNB may wait until an event A4 measurement report (MR) is received, the traffic condition becomes disabled, or a restricted QCI bearer is set up.

If an event A4 MR is received at operation 835, the procedure proceeds to operation 840. At operation 840, the eNB may check whether the cell reported by the MR is an SCell paired with the PCell. If co-scheduling is not allowed, the procedure returns to operation 835. At operation 835, the eNB may wait until an event A4 MR is received, the traffic condition becomes disabled, or a restricted QCI bearer is set up. If co-scheduling is allowed at operation 840, the procedure proceeds to operation 845. At operation 845, the eNB may check whether the SCell satisfies all the conditions for SCell addition.

If all the conditions for SCell addition are satisfied at operation 845, the procedure proceeds to operation 850. At operation 850, the eNB may configure settings for paired SCell addition, event A2 registration for SCell release, and event A4 deregistration (without using a separate RRC connection reconfiguration message). Thereafter, the procedure proceeds to operation 855. At operation 855, the eNB may add the SCell and wait.

If not all the conditions for SCell addition are satisfied at operation 845, the procedure proceeds to operation 860. At operation 860, the eNB may deregister event A4. Thereafter, the procedure returns to operation 825 at which the eNB may wait until the traffic condition becomes enabled or a restricted bearer is set up.

If a restricted QCI bearer is set up at operation 835, the procedure proceeds to operation 865. At operation 865, the eNB may deregister event A4. Thereafter, the procedure proceeds to operation 815 at which the eNB waits until all restricted QCI bearers are released.

If the traffic condition becomes disabled at operation 835, the procedure proceeds to operation 860. Operation 860 is described before.

If restricted QCI bearers are released at operation 815, the procedure proceeds to operation 820. Operation 820 is described before.

If a restricted QCI bearer is set up at operation 825, the eNB may wait until all restricted QCI bearers are released. If the traffic condition becomes enabled, the eNB may register event A4 for SCell addition triggering.

If an event A2 MR is received at operation 855, the procedure proceeds to operation 870 at which the eNB may release the requested SCell. Thereafter, the procedure returns to operation 830 at which the eNB may register event A4 for SCell addition triggering.

If a CA-CAC SCell release request is received or the traffic condition becomes disabled at operation 855, the procedure proceeds to operation 875 at which the eNB may release the requested SCell. Thereafter, the procedure proceeds to operation 825 at which the eNB may wait until the traffic condition becomes enabled or a restricted QCI bearer is set up.

If a restricted QCI bearer is set up at operation 855, the procedure proceeds to operation 880 at which the eNB may release the requested SCell. Thereafter, the procedure proceeds to operation 815 at which the eNB may wait until all restricted QCI bearers are released.

If the traffic-based CA flag is set to "off" at operation 805 in FIG. 8, the procedure proceeds to operation 910 in FIG. 9. At operation 910, the eNB may examine whether a restricted QCI bearer is set up. If a restricted QCI bearer is set up, the procedure proceeds to operation 915. At operation 915, the eNB may wait until all restricted QCI bearers are released. If a restricted QCI bearer is not set up at operation 910, the procedure proceeds to operation 945.

At operation 945, the eNB may check whether all the conditions for SCell addition are satisfied. If all the conditions for SCell addition are satisfied, the procedure proceeds to operation 950. At operation 950, the eNB may configure settings for paired SCell addition, event A2 registration for SCell release, and event A4 deregistration. Here, a separate RRC connection reconfiguration message may be not used. Thereafter, the procedure proceeds to operation 955. At operation 955, the eNB may add the SCell and wait.

If not all the conditions for SCell addition are satisfied at operation 945, the procedure proceeds to operation 960. At operation 960, the eNB may deregister event A4 and does not take any action with respect to SCell addition until the corresponding call is released.

If a bearer with QCI=x is released at operation 915, the procedure proceeds to operation 930. At operation 930, the eNB may register event A4 for SCell addition triggering. Thereafter, the procedure proceeds to operation 935 at which the eNB may wait until an event A4 MR is received or a restricted QCI bearer is set up. The procedure proceeds from operation 930 to operation 935. If an event A4 MR is received at operation 935, the procedure proceeds to operation 940. At operation 940, the eNB may check whether the cell reported by the MR is an SCell paired with the PCell.

If co-scheduling is not allowed, the procedure returns to operation 935 at which the eNB may wait until an event A4 MR is received, or a restricted QCI bearer is set up.

If co-scheduling is allowed at operation 940, the procedure proceeds to operation 945. Operation 945 is described before.

If an event A2 MR is received at operation 955, the procedure proceeds to operation 970 at which the eNB may release the requested SCell. Thereafter, the procedure returns to operation 930 at which the eNB may register event A4 for SCell addition triggering.

If a CA-CAC SCell release request is received at operation 955, the procedure proceeds to operation 975 at which the eNB may release the requested SCell. Thereafter, the procedure proceeds to operation 985 at which the eNB does not take any action with respect to the SCell until the corresponding call is released.

If a restricted QCI bearer is set up at operation 955, the procedure proceeds to operation 980 at which the eNB may release the requested SCell. Thereafter, the procedure returns to operation 915 at which the eNB may wait until all restricted QCI bearers are released.

In the embodiment, even if the MR of the UE for SCell addition does not satisfy the co-schedulability condition, since event A4 is not deregistered, it is possible for another cell to trigger an SCell addition request again. However, when the condition for SCell addition is not satisfied, the opportunity for SCell addition is not allowed until the traffic condition is changed from enabled to disabled, the UE is connected next time, or the UE is handed over to another cell.

Figure 10A:
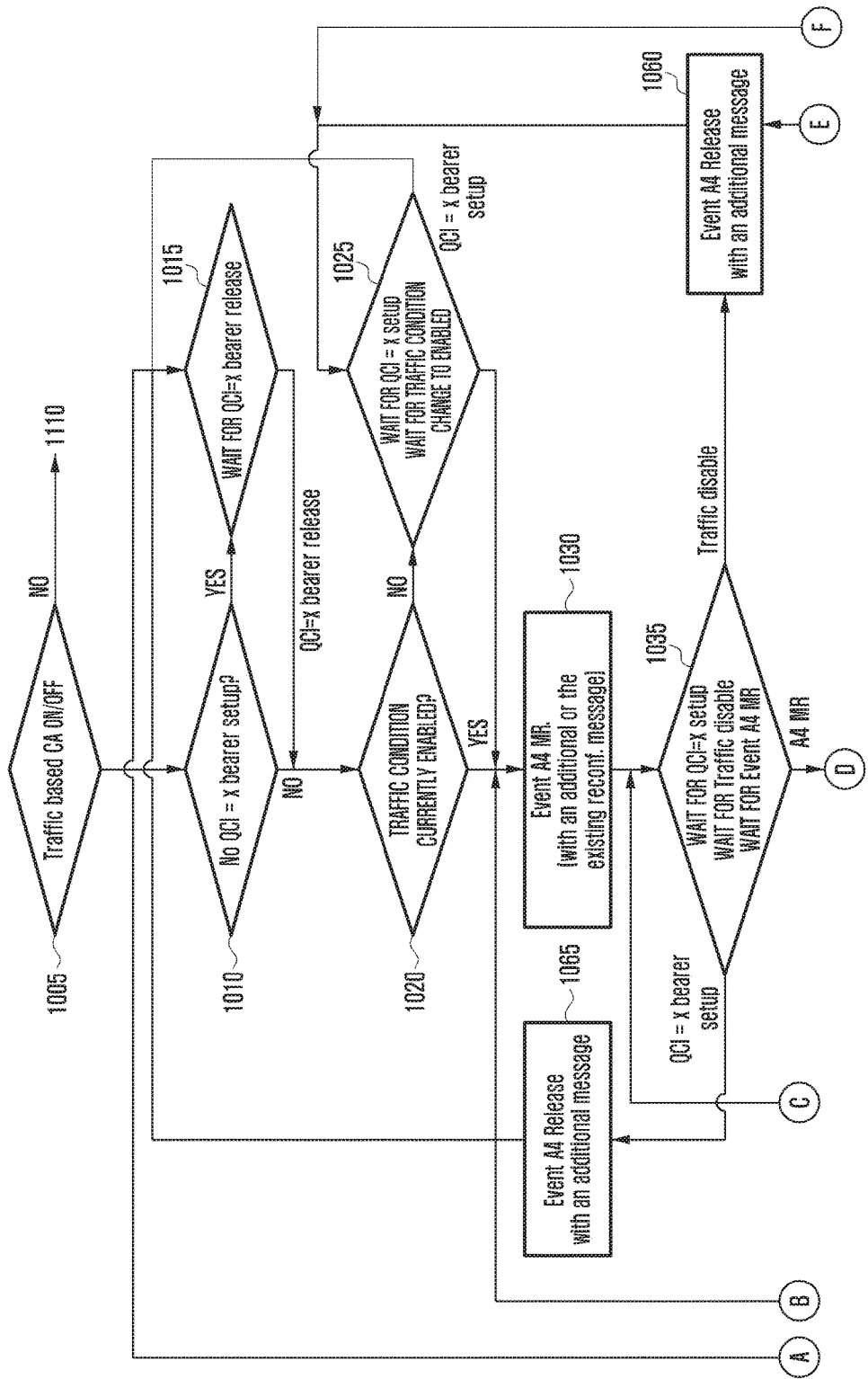
FIG. 10 illustrates SCell configuration in Mode 3 during traffic-based CA activation according to an embodiment of the present invention.
Figure 10B:
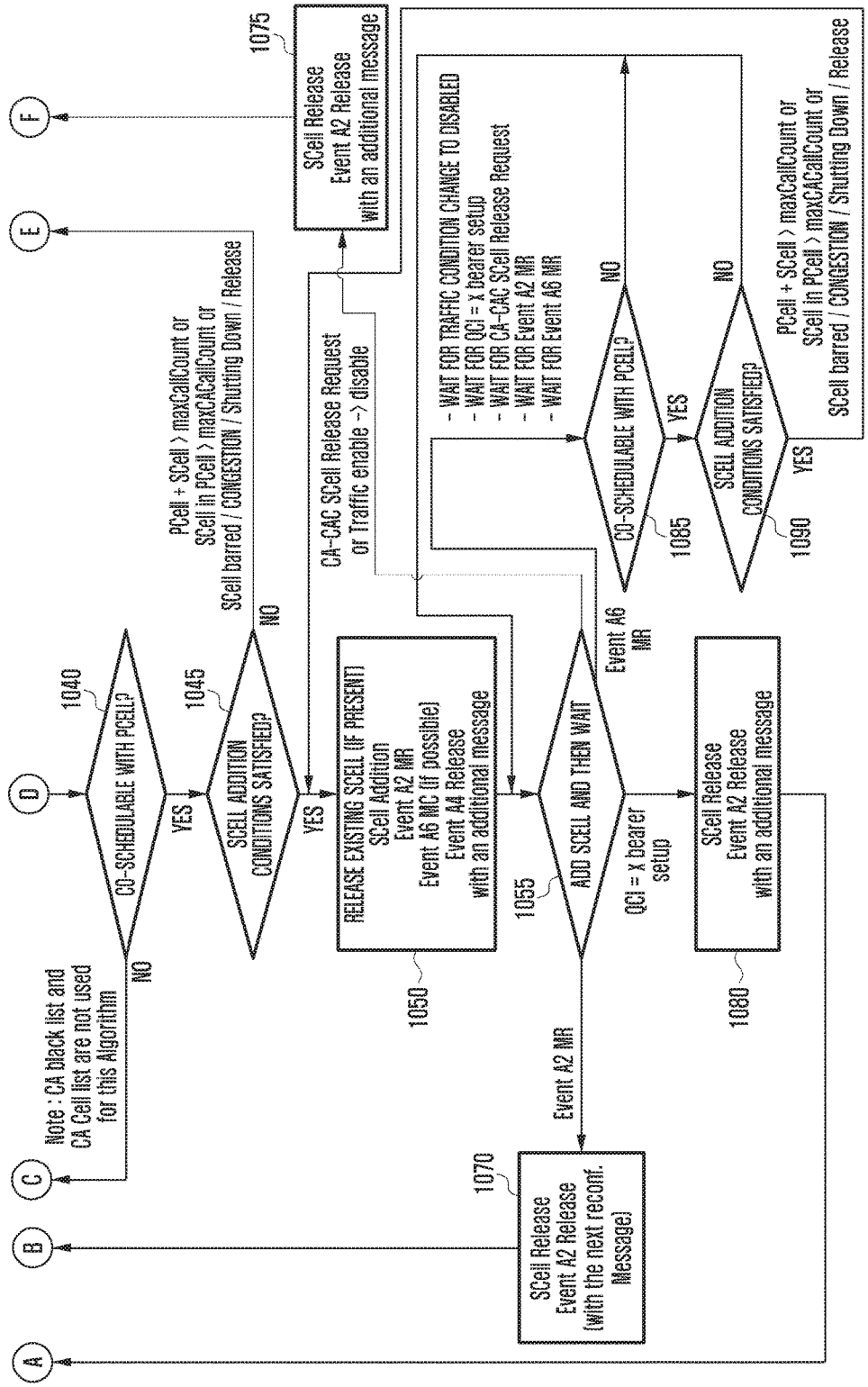
Figure 11A:
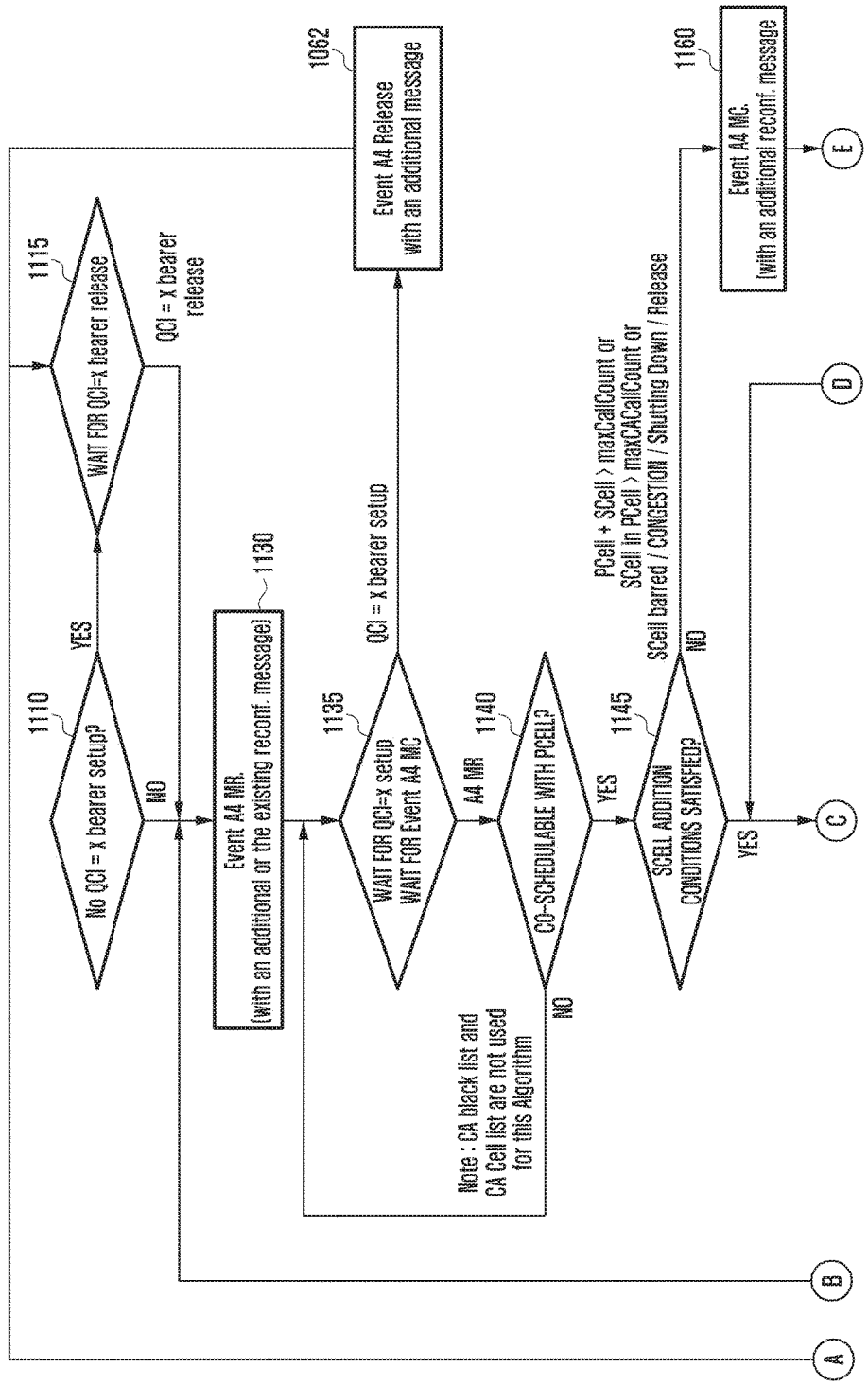
FIG. 11 illustrates SCell configuration in Mode 3 during traffic-based CA deactivation according to an embodiment of the present invention.
Figure 11B:
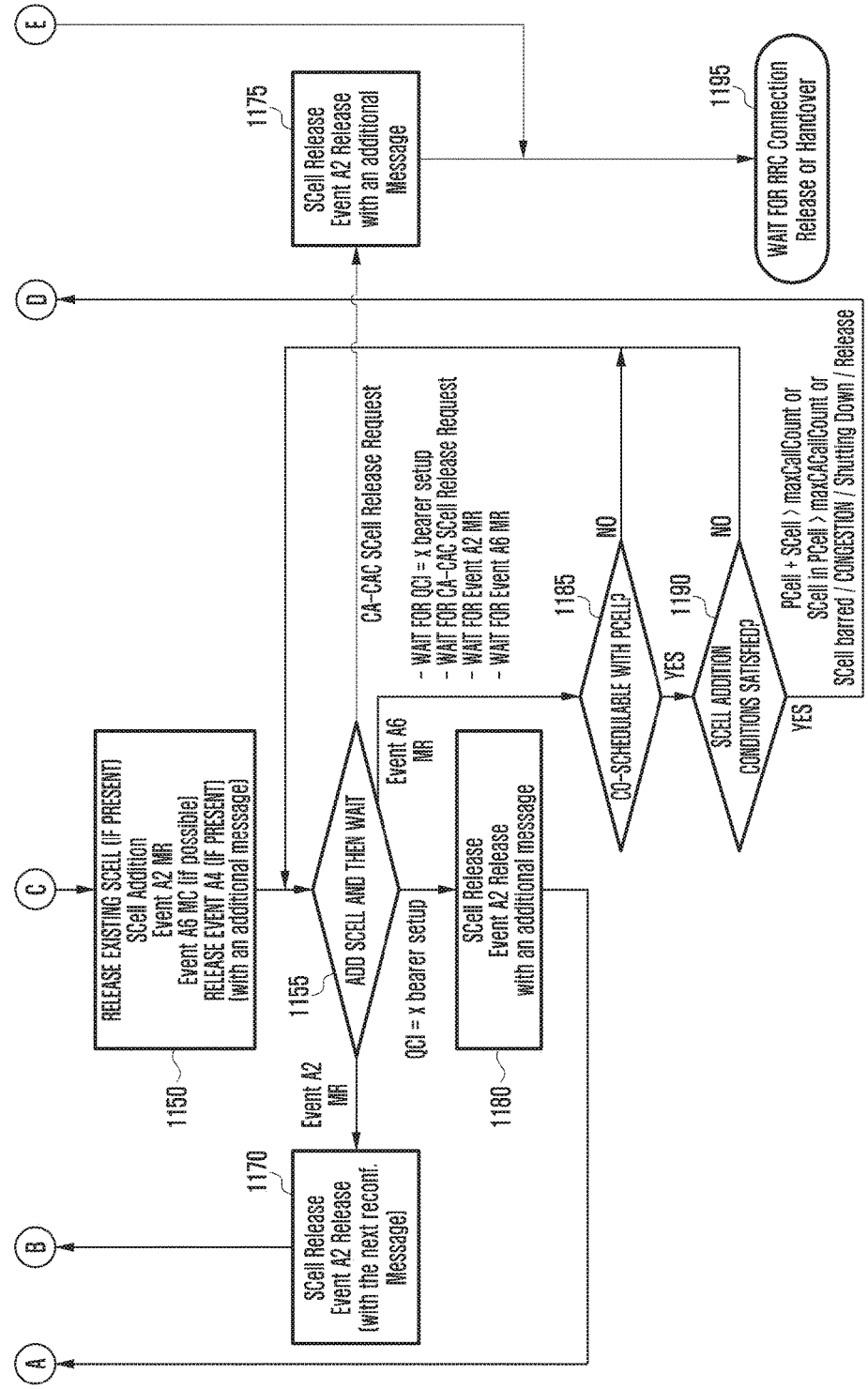

FIG. 10 illustrates operations for traffic-based CA activation in Mode 3, and FIG. 11 illustrates operations for traffic-based CA deactivation in Mode 3.

If the mode is identified as Mode 3 in FIG. 5, the eNB follows the procedure of FIGS. 10 and 11. In FIG. 10, at operation 1005, the eNB may examine the traffic-based CA flag. If the traffic-based CA flag is set to "on", the eNB starts to monitor the traffic condition.

At operation 1010, the eNB may examine whether a restricted QCI bearer is set up. If a restricted QCI bearer is set up, the procedure proceeds to operation 1015 at which the eNB waits until all restricted QCI bearers are released. If a restricted QCI bearer is not set up, the procedure proceeds to operation 1020 at which the eNB may determine whether the traffic condition is currently enabled.

If the traffic condition is disabled, the procedure proceeds to operation 1025 at which the eNB may wait until the traffic condition becomes enabled or a restricted QCI bearer is set up. If the traffic condition becomes enabled, the procedure proceeds to operation 1030 at which the eNB may register event A4 for SCell addition triggering.

At operation 1035, the eNB may wait until an event A4 MR is received, the traffic condition becomes disabled, or a restricted QCI bearer is set up.

If an event A4 MR is received at operation 1035, the procedure proceeds to operation 1040. At operation 1040, the eNB may check whether the cell reported by the MR is co-schedulable with the PCell. If co-scheduling is not allowed, the procedure returns to operation 1035. The eNB may wait until an event A4 MR is received, the traffic condition becomes disabled, or a restricted QCI bearer is set up.

If co-scheduling is allowed at operation 1040, the procedure proceeds to operation 1045 at which the eNB may check whether all the conditions for SCell addition are satisfied. If all the conditions for SCell addition are satisfied at operation 1045, the procedure proceeds to operation 1050 at which the eNB may configure settings for SCell addition, event A2 (and A6) registration for SCell release, and event A4 deregistration. Here, a separate RRC connection reconfiguration message may be not used. Thereafter, at operation 1055, the eNB may add the SCell and enter the wait state.

If not all the conditions for SCell addition are satisfied at operation 1045, the procedure proceeds to operation 1060 at which the eNB may deregister event A4. Thereafter, the procedure returns to operation 1025 at which the eNB may wait until the traffic condition becomes enabled or a restricted bearer is set up.

If a restricted QCI bearer is set up at operation 1035, the procedure proceeds to operation 1065 at which the eNB may deregister event A4. Thereafter, the procedure returns to operation 1015 at which the eNB waits until all restricted QCI bearers are released.

If the traffic condition becomes disabled at operation 1035, the procedure proceeds to operation 1060 at which the eNB may deregister event A4. Thereafter, the procedure returns to operation 1025 at which the eNB may wait until the traffic condition becomes enabled or a restricted bearer is set up.

If restricted QCI bearers are released at operation 1015, the procedure proceeds to operation 1020 at which the eNB may determine whether the traffic condition is currently enabled.

If a restricted QCI bearer is set up at operation 1025, the procedure proceeds to operation 1015 at which the eNB may wait until all restricted QCI bearers are released.

If the traffic condition becomes enabled at operation 1020, the procedure proceeds to operation 1030 at which the eNB may register event A4 for SCell addition triggering.

If an event A2 MR is received at operation 1055, the procedure proceeds to operation 1070 at which the eNB may release the requested SCell. Thereafter, the procedure returns to operation 1030 at which the eNB may register event A4 for SCell addition triggering.

If a CA-CAC SCell release request is received or the traffic condition becomes disabled at operation 1055, the procedure proceeds to operation 1075 at which the eNB may release the requested SCell. Thereafter, at operation 1025, the eNB may wait until the traffic condition becomes enabled or a restricted QCI bearer is set up.

If a restricted QCI bearer is set up at operation 1055, the procedure proceeds to operation 1080 at which the eNB may release the requested SCell. Thereafter, the procedure proceeds to operation 1015 at which the eNB may wait until all restricted QCI bearers are released.

If an event A6 MR is received at operation 1055, the procedure proceeds to operation 1085 at which the eNB may check whether the cell reported by the MR is co-schedulable with the PCell. If co-scheduling is not allowed, the procedure returns to operation 1055 at which the eNB may add the SCell and enter the wait state. If co-scheduling is allowed, the procedure proceeds to operation 1090. At operation 1090, the eNB may check whether all the conditions for SCell addition are satisfied. If all the conditions for SCell addition are satisfied, the procedure returns to operation 1050 at which the eNB may release the existing SCell. At operation 1050, the eNB may configure settings for SCell addition, event A2 (and A6) registration for SCell release, and event A4 deregistration. If not all the conditions for SCell addition are satisfied, the procedure proceeds to operation 1055 at which the eNB may add the SCell and enter the wait state.

If the traffic-based CA flag is set to "off" at operation 1005 in FIG. 10, the procedure proceeds to operation 1110 in FIG. 11. At operation 1110, the eNB may examine whether a restricted QCI bearer is set up.

If a restricted QCI bearer is set up, at operation 1115, the eNB may wait until all restricted QCI bearers are released. If a restricted QCI bearer is not set up, at operation 1130, the eNB may register event A4 for SCell addition triggering. Thereafter, the procedure proceeds to operation 1140 at which the eNB may wait until an event A4 MR is received or a restricted QCI bearer is set up.

If an event A4 MR is received, at operation 1140, the eNB may check whether the cell reported by the MR is co-schedulable with the PCell. If co-scheduling is not allowed, the procedure proceeds to operation 1135. If co-scheduling is allowed, the procedure proceeds to operation 1145. At operation 1145, the eNB may check whether all the conditions for SCell addition are satisfied.

If not all the conditions for SCell addition are satisfied at operation 1145, the procedure proceeds to operation 1160 at which the eNB may deregister event A4. Thereafter, the procedure proceeds to operation 1195 at which the eNB does not take any action with respect to the SCell until the corresponding call is released.

If all the conditions for SCell addition are satisfied at operation 1145, the procedure proceeds to operation 1150. At operation 1150, the eNB may configure settings for SCell addition, event A2 (and A6) registration for SCell release, and event A4 deregistration. Thereafter, the procedure proceeds to operation 1155 at which the eNB may add the SCell and enter the wait state.

If a restricted QCI bearer is set up at operation 1135, the procedure proceeds to operation 1162 at which the eNB may deregister event A4. Thereafter, the procedure returns to operation 1115 at which the eNB waits until all restricted QCI bearers are released. If all restricted QCI bearers are released at operation 1115, the procedure proceeds to operation 1130.

If an event A2 MR is received at operation 1155, the procedure proceeds to operation 1170 at which the eNB may release the requested SCell and deregister event A2. Thereafter, the procedure proceeds to operation 1130 at which the eNB may register event A4 for SCell addition triggering.

If a CA-CAC SCell release request is received at operation 1155, the procedure proceeds to operation 1175 at which the eNB may release the requested SCell and deregister event A2. Thereafter, the procedure proceeds to operation 1195 at which the eNB does not take any action until the corresponding call is released.

If a restricted QCI bearer is set up at operation 1155, the procedure proceeds to operation 1180 at which the eNB may release the requested SCell and deregister event A2. Thereafter, the procedure returns to operation 1115 at which the eNB may wait until all restricted QCI bearers are released.

If an event A6 MR is received at operation 1155, the procedure proceeds to operation 1185 at which the eNB may check whether the cell reported by the MR is co-schedulable with the PCell. If co-scheduling is not allowed, the procedure returns to operation 1155 at which the eNB may add the SCell and enter the wait state. If co-scheduling is allowed, the procedure proceeds to operation 1190 at which the eNB may check whether all the conditions for SCell addition are satisfied. If all the conditions for SCell addition are satisfied, the procedure proceeds to operation 1150 at which the eNB may release the existing SCell and configure settings for SCell addition, event A2 (and A6) registration for SCell release, and event A4 deregistration. Release of the existing SCell may also be handled by the same RRC connection reconfiguration message. If not all the conditions for SCell addition are satisfied, the procedure proceeds to operation 1155 at which the eNB may add the SCell and enter the wait state.

Even if the MR of the UE for SCell addition does not satisfy the co-schedulability condition, since event A4 is not deregistered, it is possible for another cell to trigger an SCell addition request again. However, when the condition for SCell addition is not satisfied, the opportunity for SCell addition is not allowed until the traffic condition is changed from enabled to disabled, the UE is connected next time, or the UE is handed over to another cell.

FIG. 12 illustrates operations and mode branches during handover according to an embodiment of the present invention.

At operation 1210, the eNB can perform the following operations upon reception of a handover request message from the UE or after an inter-eNB handover decision.

If the following conditions are satisfied at operation 1220, the procedure proceeds to operation 1230.

The UE capability IE of the UE should satisfy a CA band combination; the requesting UE should not be a restricted UE designated by a core node (CN); and the CA on/off flag of the PCell should be "on".

If the above conditions are satisfied, the procedure proceeds to operation 1230. At operation 1230, the eNB identifies the CA operation mode. Depending upon the CA operation mode, the procedure proceeds to operation 1240, operation 1250, or operation 1260 if the CA operation mode is Mode 1, Mode 2, or Mode 3.

Operation 1240 and subsequent operations are described with reference to FIG. 13; operation 1250 and subsequent operations are described with reference to FIG. 14; and operation 1260 and subsequent operations are described with reference to FIG. 15.

Figure 13A:
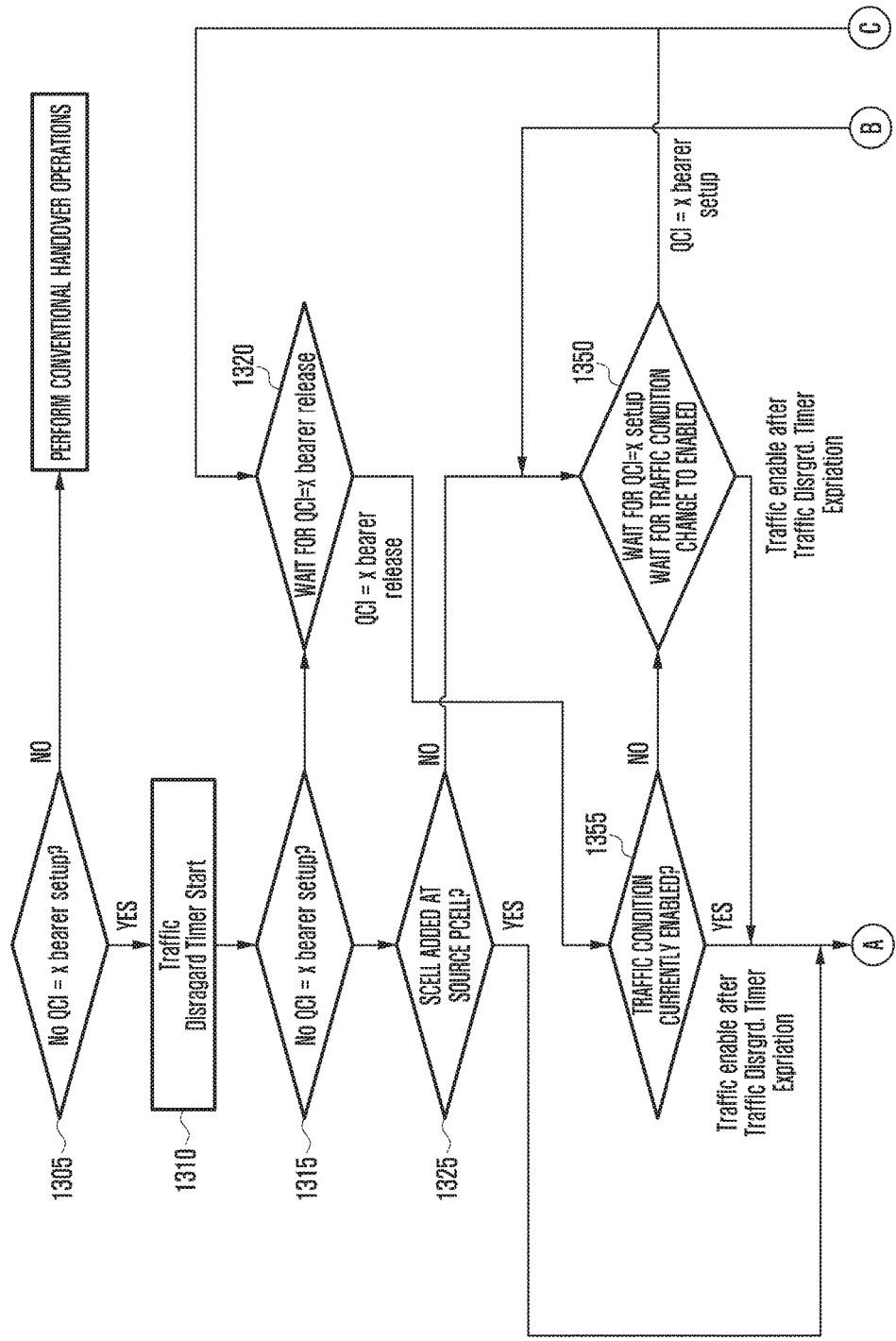
FIG. 13 illustrates SCell configuration in Mode 1 during handover according to an embodiment of the present invention.
Figure 13B:
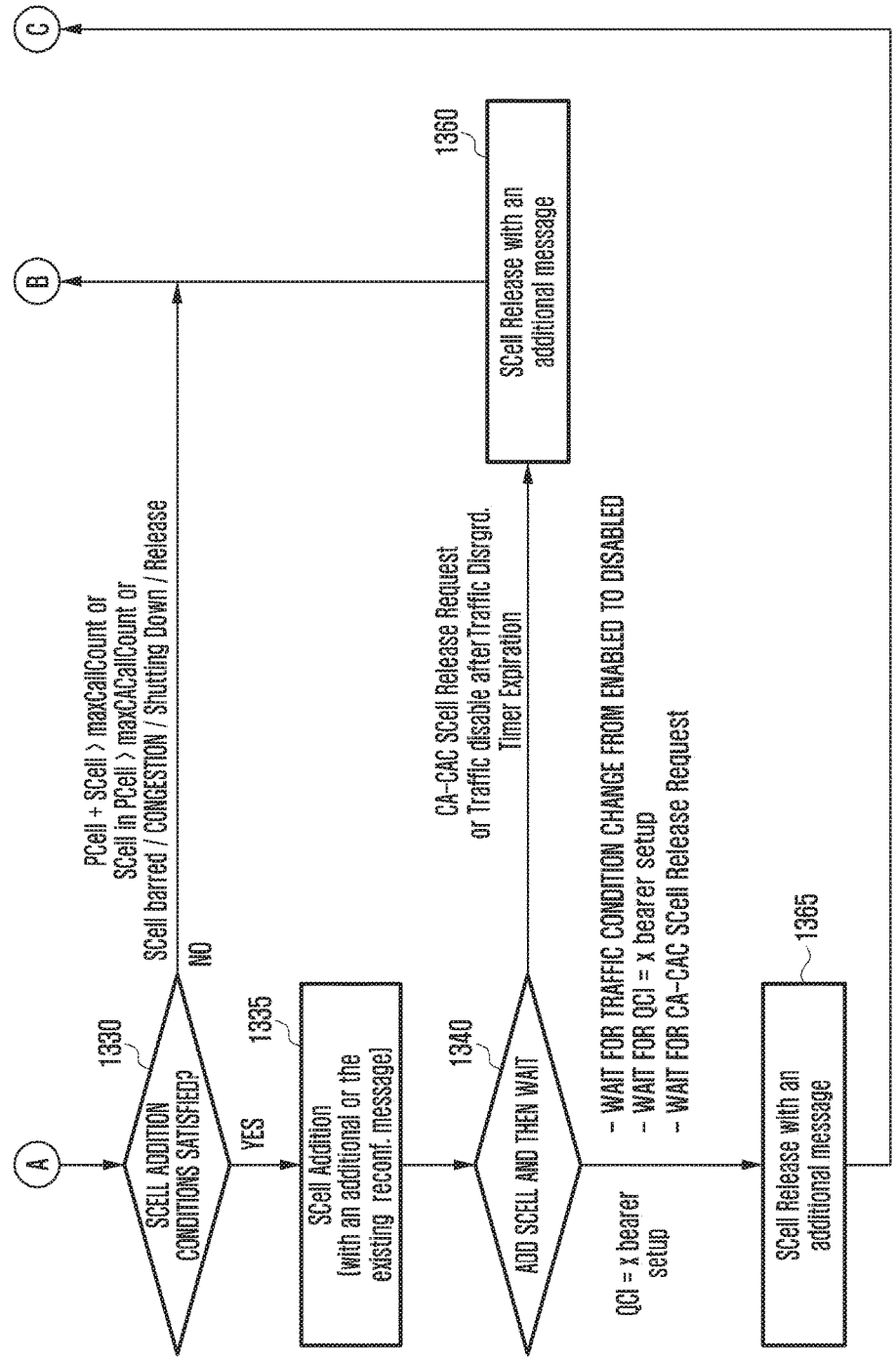
Figure 14A:
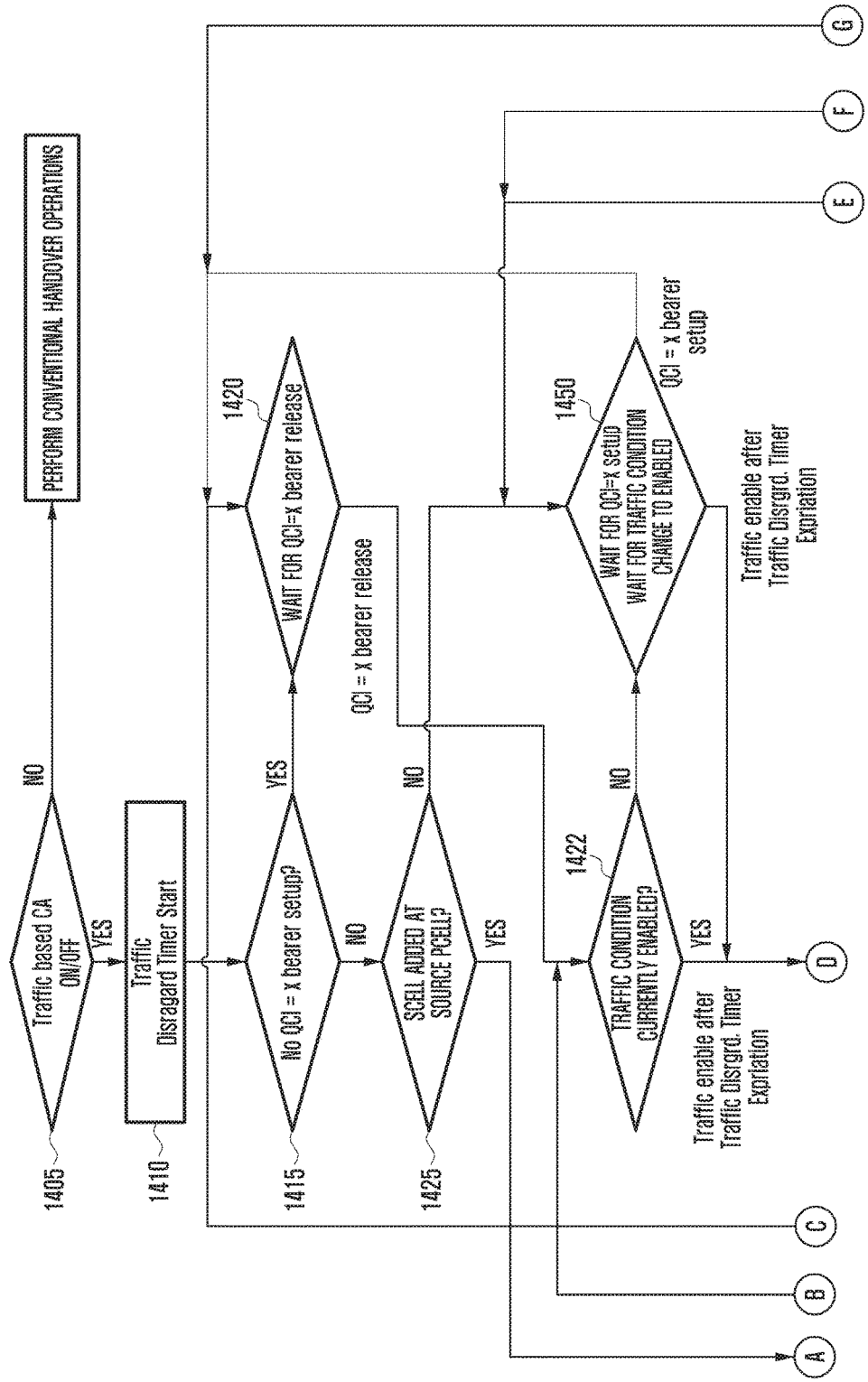
FIG. 14 illustrates SCell configuration in Mode 2 during handover according to an embodiment of the present invention.
Figure 14B:
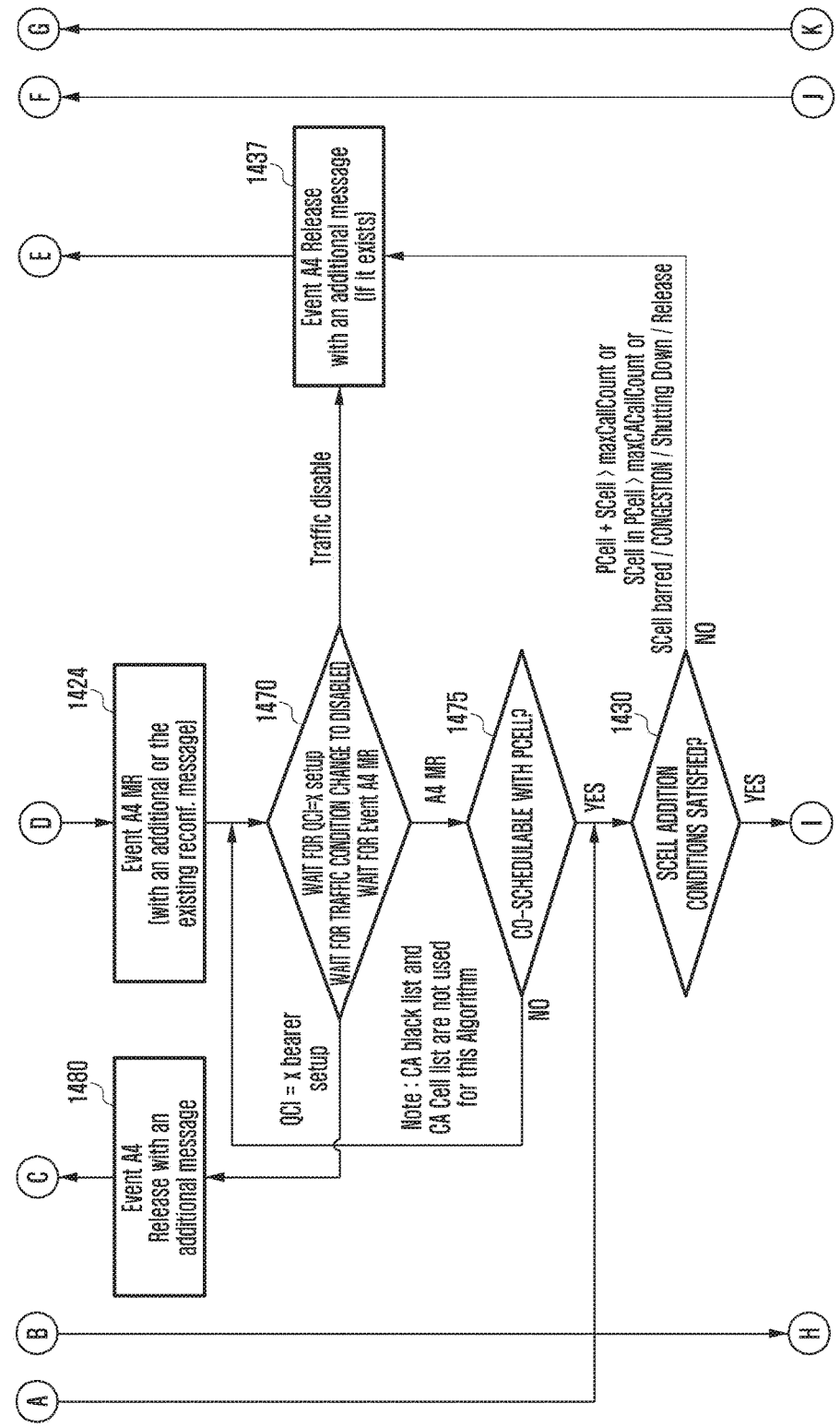
Figure 14C:
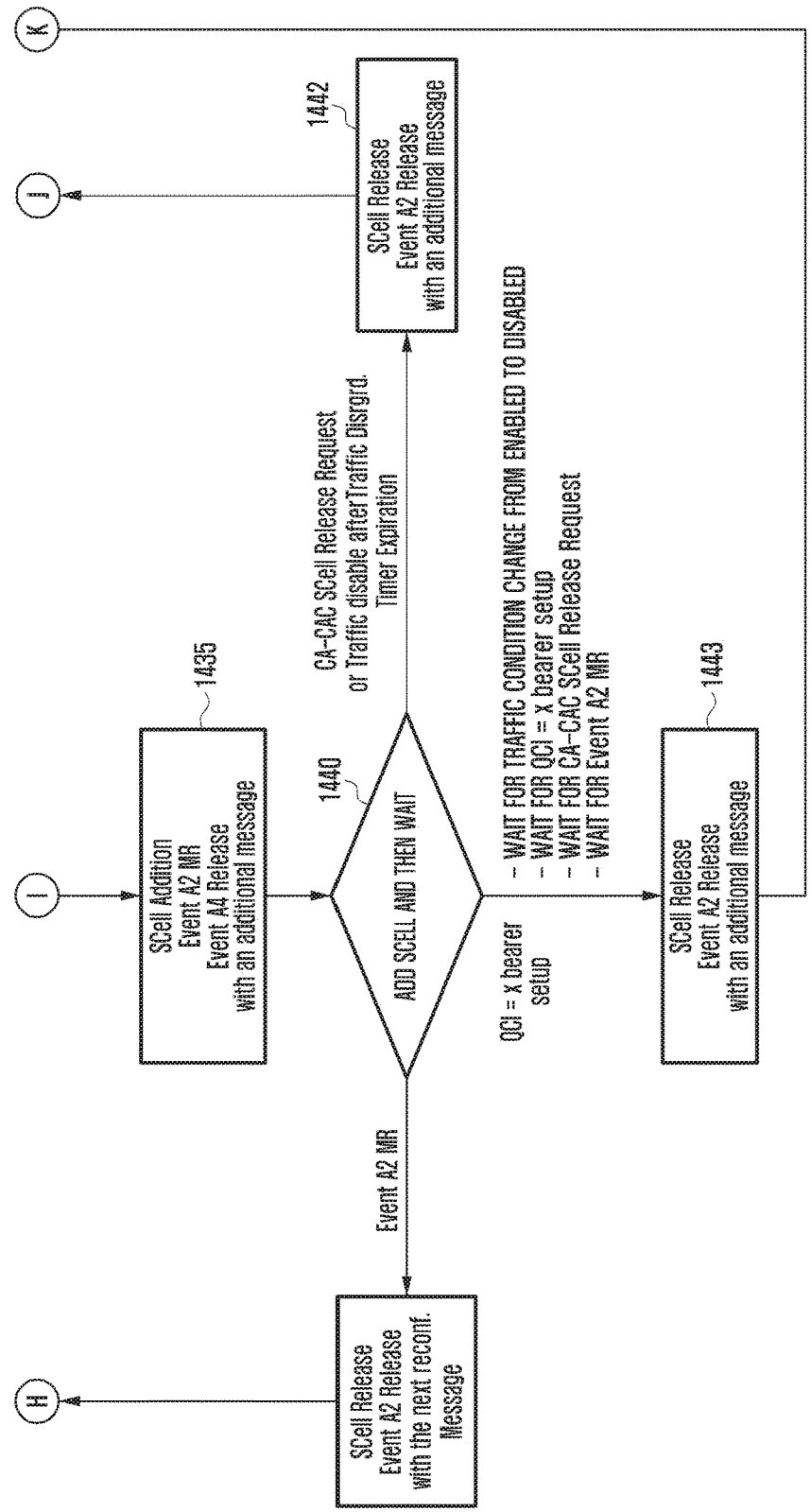
Figure 15A:
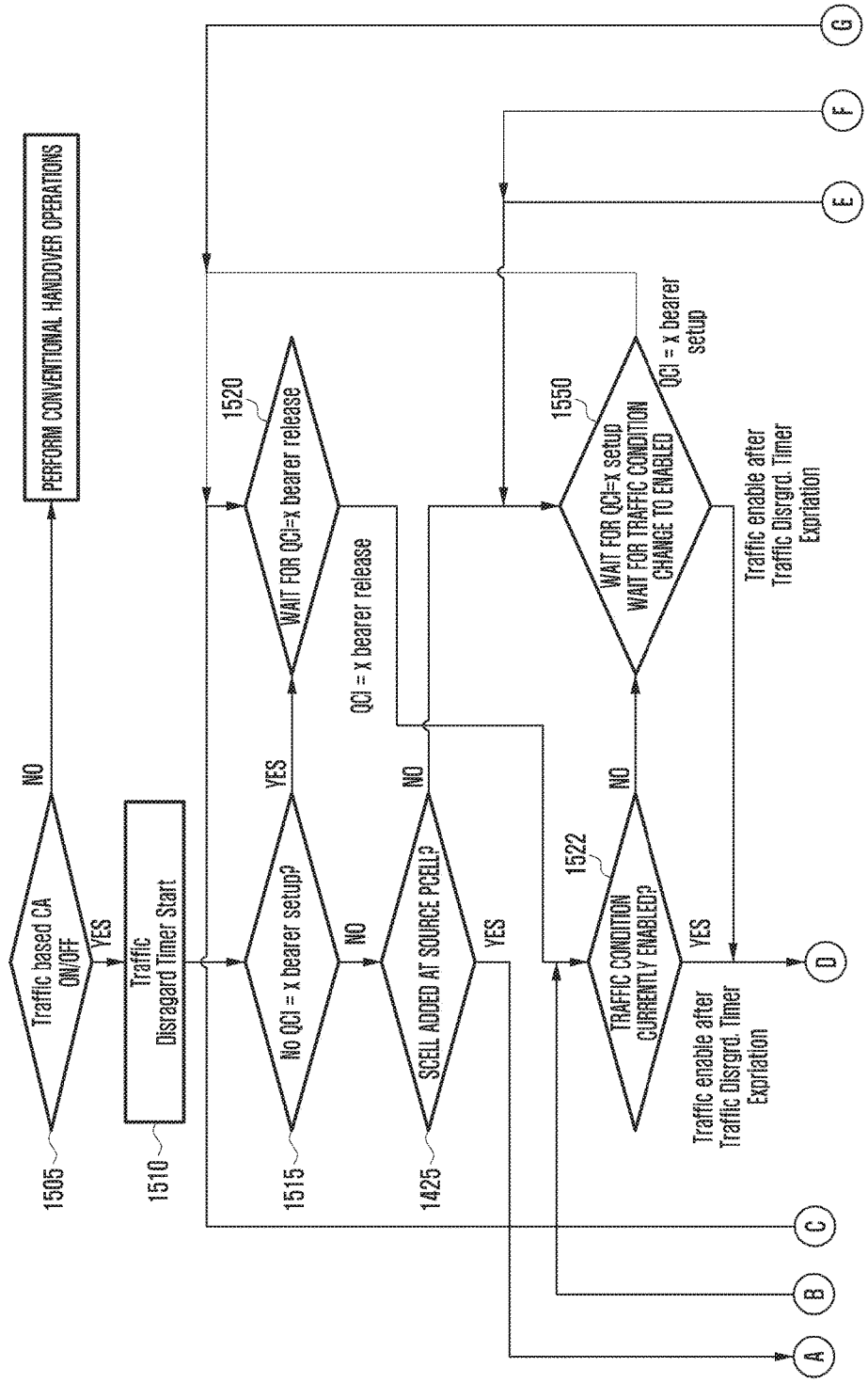
FIG. 15 illustrates SCell configuration in Mode 3 during handover according to an embodiment of the present invention.
Figure 15B:
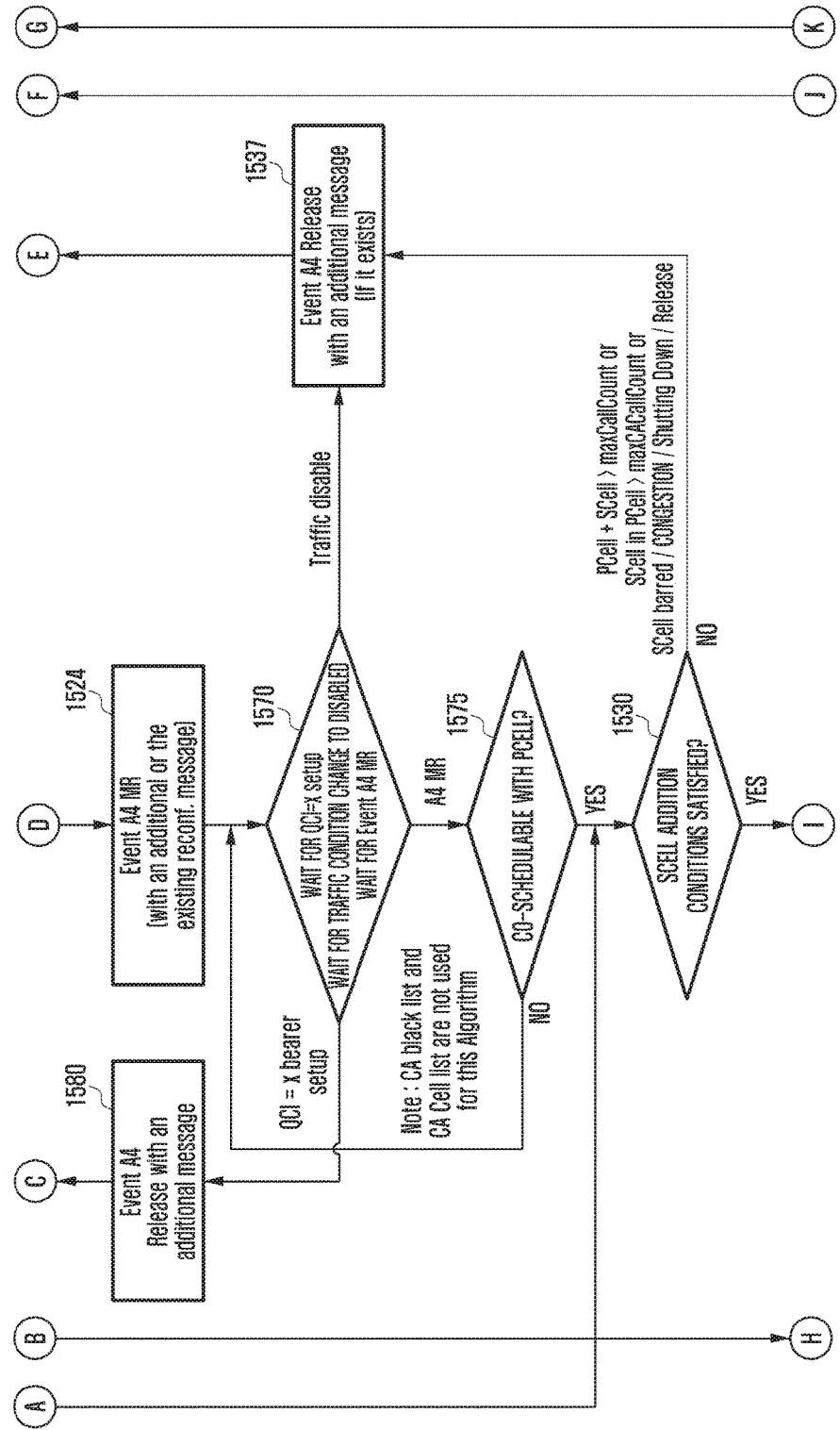
Figure 15C:
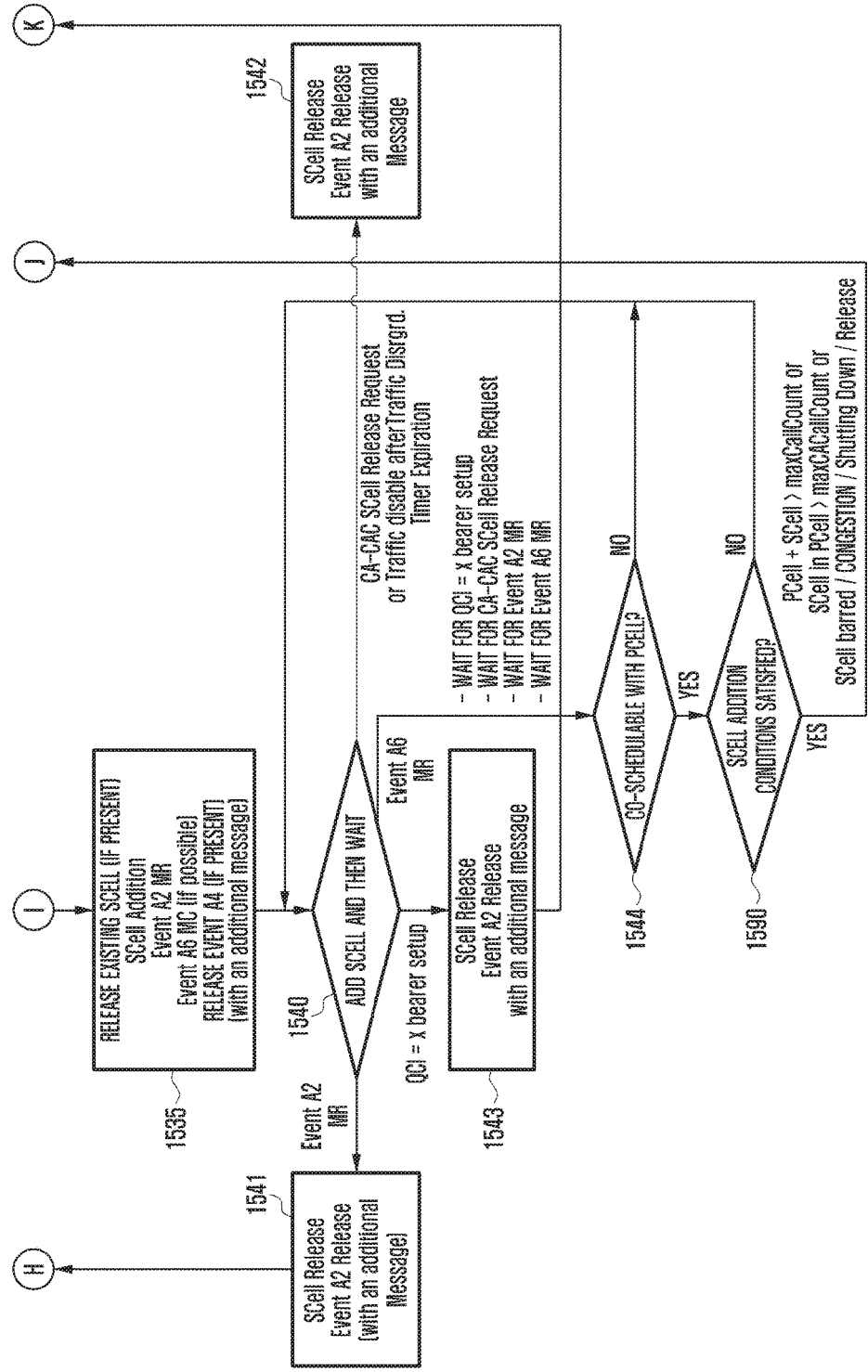

In FIGS. 13 to 15, a description is given of the case where the traffic-based CA flag is "on". If the traffic-based CA flag is "off", the operations are the same as SCell addition operations in the existing handover procedure.

FIG. 13 illustrates SCell configuration in Mode 1 during handover according to an embodiment of the present invention.

At operation 1305, the eNB may examine the traffic-based CA flag. If the traffic-based CA flag is set to "on", the eNB starts to monitor the traffic condition. Thereafter, the procedure proceeds to operation 1310 at which the eNB starts a handover timer. This timer may be a traffic disregard timer.

At operation 1315, the eNB may examine whether a restricted QCI bearer is set up. If a restricted QCI bearer is set up, the procedure proceeds to operation 1320. At operation 1320, the eNB may wait until all restricted QCI bearers are released. If a restricted QCI bearer is not set up at operation 1315, the procedure proceeds to operation 1325 at which the eNB checks whether an SCell has been configured in the UE at the source PCell.

If an SCell has been configured at the source PCell, the procedure proceeds to operation 1330 at which the eNB may check whether all the conditions for SCell addition are satisfied. If all the conditions for SCell addition are satisfied, the procedure proceeds to operation 1335 at which the eNB may add an SCell paired with the PCell (paired SCell addition). Here, a separate RRC connection reconfiguration message may be not used. Thereafter, the procedure proceeds to operation 1340 at which the eNB may add the SCell and wait.

If not all the conditions for SCell addition are satisfied at operation 1330, the procedure proceeds to operation 1350 at which the eNB may wait until the traffic condition becomes enabled again or a restricted QCI bearer is set up.

If no SCell has been configured at the source PCell at operation 1325, the procedure proceeds to operation 1350.

If restricted QCI bearers are released at operation 1320, the procedure proceeds to operation 1355 at which the eNB may check whether the traffic condition is currently enabled.

If a restricted QCI bearer is set up at operation 1315, the procedure proceeds to operation 1320 at which the eNB may wait until all restricted QCI bearers are released.

If the traffic condition is enabled at operation 1355, the procedure returns to operation 1330 at which the eNB may check whether all the conditions for SCell addition are satisfied.

If a CA-CAC SCell release request is received or the traffic condition becomes disabled at operation 1340, the procedure proceeds to operation 1360 at which the eNB may release the requested SCell. Thereafter, the procedure proceeds to operation 1350 at which the eNB may wait until the traffic condition becomes enabled or a restricted QCI bearer is set up.

If a restricted QCI bearer is set up at operation 1340, the procedure proceeds to operation 1365 at which the eNB may release the requested SCell. Thereafter, the procedure proceeds to operation 1320 at which the eNB may wait until all restricted QCI bearers are released.

FIG. 14 illustrates SCell configuration in Mode 2 during handover according to an embodiment of the present invention.

With reference to FIG. 14, at operation 1405, the eNB may examine the traffic-based CA flag. If the traffic-based CA flag is set to "on", the eNB starts to monitor the traffic condition. Thereafter, the procedure proceeds to operation 1410 at which the eNB starts the traffic disregard timer for handover.

At operation 1415, the eNB may examine whether a restricted QCI bearer is set up. If a restricted QCI bearer is set up, the procedure proceeds to operation 1420 at which the eNB may wait until all restricted QCI bearers are released. If a restricted QCI bearer is not set up, the procedure proceeds to operation 1425 at which the eNB checks whether an SCell has been configured in the UE at the source PCell.

If an SCell has been configured at the source PCell at operation 1425, the procedure proceeds to operation 1430 at which the eNB may check whether all the conditions for SCell addition are satisfied. If all the conditions for SCell addition are satisfied, the procedure proceeds to operation 1435 at which the eNB may configure settings for paired SCell addition, event A2 registration for SCell release, and event A4 deregistration. Here, a separate RRC connection reconfiguration message may be not used. Thereafter, the procedure proceeds to operation 1440 at which the eNB may add the SCell and wait.

If not all the conditions for SCell addition are satisfied at operation 1430, the procedure proceeds to operation 1437 at which the eNB may deregister event A4. Thereafter, the procedure proceeds to operation 1450 at which the eNB may wait until the traffic condition becomes enabled or a restricted QCI bearer is set up.

If no SCell has been configured at the source PCell at operation 1425, the procedure proceeds to operation 1450 at which the eNB may wait until the traffic condition becomes enabled or a restricted QCI bearer is set up.

If an event A4 MR is received at operation 1470, the procedure proceeds to operation 1475 at which the eNB may check whether the cell reported by the MR is co-schedulable with the PCell. If co-scheduling is not allowed, the procedure returns to operation 1470 at which the eNB may wait until an event A4 MR is received, the traffic condition becomes disabled, or a restricted QCI bearer is set up. If co-scheduling is allowed, the procedure proceeds to operation 1430 at which the eNB may check whether all the conditions for SCell addition are satisfied.

If a restricted QCI bearer is set up at operation 1470, the procedure proceeds to operation 1480 at which the eNB may deregister event A4. Thereafter, the procedure returns to operation 1420 at which the eNB waits until all restricted QCI bearers are released.

If the traffic condition becomes disabled at operation 1470, the procedure proceeds to operation 1437 at which the eNB may deregister event A4. Thereafter, the procedure returns to operation 1450.

If restricted QCI bearers are released at operation 1420, the procedure proceeds to operation 1422 at which the eNB may check whether the traffic condition is currently enabled. If the traffic condition is disabled, the procedure proceeds to operation 1450 at which the eNB may wait until the traffic condition becomes enabled or a restricted QCI bearer is set up. If the traffic condition is enabled, the procedure proceeds to operation 1424 at which the eNB may register event A4 for SCell addition triggering. Thereafter, the procedure proceeds to operation 1470 at which the eNB may wait until an event A4 MR is received, the traffic condition becomes disabled, or a restricted QCI bearer is set up.

If a restricted QCI bearer is set up at operation 1450, the procedure proceeds to operation 1420. If the traffic condition becomes enabled at operation 1450, the procedure proceeds to operation 1424.

If an event A2 MR is received at operation 1440, the procedure proceeds to operation 1441 at which the eNB may release the requested SCell. Thereafter, the procedure proceeds to operation 1422 at which the eNB may register event A4 for SCell addition triggering.

If a CA-CAC SCell release request is received or the traffic condition becomes disabled at operation 1440, the procedure proceeds to operation 1442 at which the eNB may release the requested SCell. Thereafter, the procedure proceeds to operation 1450.

If a restricted QCI bearer is set up at operation 1440, the procedure proceeds to operation 1443 at which the eNB may release the requested SCell. Thereafter, the procedure proceeds to operation 1420.

Even if the MR of the UE for SCell addition does not satisfy the co-schedulability condition, since event A4 is not deregistered, it is possible for another cell to trigger an SCell addition request again. However, when the condition for SCell addition is not satisfied, the opportunity for SCell addition is not allowed until the traffic condition is changed from enabled to disabled, the UE is connected next time, or the UE is handed over to another cell.

Conditions enabling SCell addition (try to configure the SCell configuration only if all the following conditions are satisfied)

When a cell having received an SCell addition request accepts the request, the sum of the number of UEs using the cell as the PCell and the number of UEs using the cell as an SCell should be less than or equal to maxCallCount.

The PCell and SCell should not be in a state of cell barred and congestion control.

When the SCell addition request is accepted, the number of UEs using SCells configurable in the PCell should be less than or equal to maxCACallCount.

The SCell should not be in a state of being shut down or being released.

FIG. 15 illustrates SCell configuration in Mode 3 during handover according to an embodiment of the present invention.

With reference to FIG. 15, at operation 1505, the eNB may examine the traffic-based CA flag. If the traffic-based CA flag is set to "on", the eNB starts to monitor the traffic condition. Thereafter, the procedure proceeds to operation 1510 at which the eNB starts the traffic disregard timer for handover.

Thereafter, the procedure proceeds to operation 1515 at which the eNB may examine whether a restricted QCI bearer is set up. If a restricted QCI bearer is set up, the procedure proceeds to operation 1520 at which the eNB may wait until all restricted QCI bearers are released. If a restricted QCI bearer is not set up, the procedure proceeds to operation 1525 at which the eNB checks whether an SCell has been configured in the UE at the source PCell.

If an SCell has been configured at the source PCell, the procedure proceeds to operation 1530 at which the eNB may check whether all the conditions for SCell addition are satisfied. If all the conditions for SCell addition are satisfied, the procedure proceeds to operation 1535 at which the eNB may configure settings for SCell addition, event A2 (and A6) registration for SCell release, and event A4 deregistration. Here, a separate RRC connection reconfiguration message may be not used. Thereafter, the procedure proceeds to operation 1540 at which the eNB may add the SCell and wait.

If not all the conditions for SCell addition are satisfied at operation 1530, the procedure proceeds to operation 1537 at which the eNB may deregister event A4. Thereafter, the procedure proceeds to operation 1550 at which the eNB may wait until the traffic condition becomes enabled or a restricted QCI bearer is set up.

If no SCell has been configured at the source PCell at operation 1525, the procedure proceeds to operation 1550 at which the eNB may wait until the traffic condition becomes enabled or a restricted QCI bearer is set up.

If an event A4 MR is received at operation 1570, the procedure proceeds to operation 1575 at which the eNB may check whether the cell reported by the MR is co-schedulable with the PCell. If co-scheduling is not allowed, the procedure proceeds to operation 1570.

If co-scheduling is allowed, the procedure proceeds to operation 1530.

If a restricted QCI bearer is set up at operation 1570, the procedure proceeds to operation 1580 at which the eNB may deregister event A4. Thereafter, the procedure returns to operation 1520 at which the eNB may wait until all restricted QCI bearers are released.

If the traffic condition becomes disabled at operation 1570, the procedure proceeds to operation 1537 at which the eNB may deregister event A4. Thereafter, the procedure proceeds to operation 1550.

If restricted QCI bearers are released at operation 1520, the procedure proceeds to operation 1522 at which the eNB may check whether the traffic condition is currently enabled. If the traffic condition is disabled, the procedure proceeds to operation 1550 at which the eNB may wait until the traffic condition becomes enabled or a restricted QCI bearer is set up. If the traffic condition is enabled, the procedure proceeds to operation 1524 at which the eNB may register event A4 for SCell addition triggering. Thereafter, the procedure proceeds to operation 1570 at which the eNB may wait until an event A4 MR is received, the traffic condition becomes disabled, or a restricted QCI bearer is set up.

If a restricted QCI bearer is set up at operation 1550, the procedure proceeds to operation 1520 at which the eNB may wait until all restricted QCI bearers are released.

If an event A2 MR is received at operation 1540, the procedure proceeds to operation 1541 at which the eNB may release the requested SCell. Thereafter, the procedure proceeds to operation 1522 at which the eNB may register event A4 for SCell addition triggering.

If a CA-CAC SCell release request is received or the traffic condition becomes disabled at operation 1540, the procedure proceeds to operation 1542 at which the eNB may release the requested SCell. Thereafter, the procedure proceeds to operation 1550.

If a restricted QCI bearer is set up at operation 1540, the procedure proceeds to operation 1543 at which the eNB may release the requested SCell. Thereafter, the procedure proceeds to operation 1520 at which the eNB may wait until all restricted QCI bearers are released.

If an event A6 MR is received at operation 1540, the procedure proceeds to operation 1544 at which the eNB may check whether the cell reported by the MR is co-schedulable with the PCell. If co-scheduling is not allowed, the procedure returns to operation 1540. If co-scheduling is allowed, the procedure proceeds to operation 1590 at which the eNB may check whether all the conditions for SCell addition are satisfied.

If all the conditions for SCell addition are satisfied, the eNB may release the existing SCell. The procedure proceeds to operation 1535 at which the eNB may configure settings for SCell addition, event A2 (and A6) registration for SCell release, and event A4 deregistration. Release of the existing SCell may also be handled by the same RRC connection reconfiguration message. If not all the conditions for SCell addition are satisfied, the procedure proceeds to operation 1540.

Figure 16:
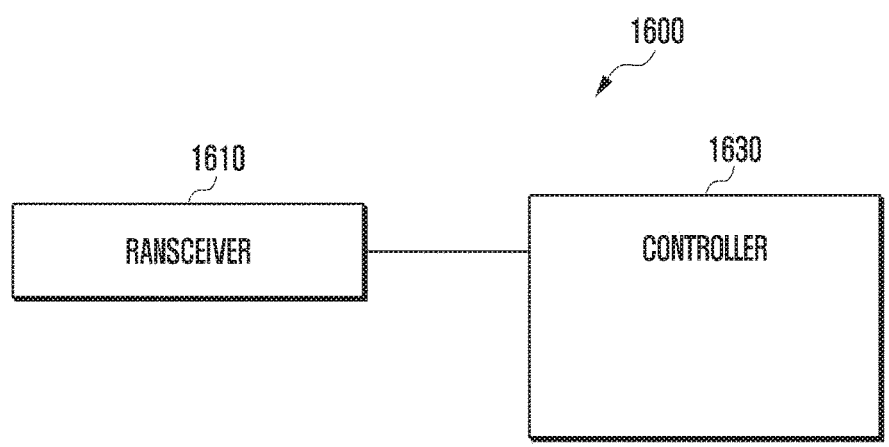
FIG. 16 illustrates a base station according to an embodiment of the present invention.

FIG. 16 illustrates a base station (eNB) according to an embodiment of the present invention.

With reference to FIG. 16, the eNB 1600 may include a transceiver 1610 to transmit and receive signals, and a controller 1630 to control the overall operation of the eNB 1600.

In one embodiment of the present invention, the controller 1630 may control a process of identifying the carrier aggregation (CA) operation mode, identifying the amount of traffic for a UE, determining whether to add an SCell in the UE on the basis of the CA operation mode and the traffic amount, and transmitting an SCell addition request message to the UE according to the determination result.

Here, the CA operation mode may include a first mode where whether to add an SCell is determined according to PCell addition and release, and a second mode where whether to add an SCell is determined according to PCell addition and a measurement report from the UE.

When the CA operation mode is the first mode, the controller 1630 may control a process of determining to add an SCell if the traffic amount is greater than or equal to a preset traffic threshold for SCell addition, and determining to release an SCell if the traffic amount is less than a preset traffic threshold for SCell release.

When the CA operation mode is the second mode, the controller 1630 may control a process of transmitting a measurement report configuration request message to the UE on the basis of the traffic amount and SCell addition and receiving a measurement report message from the UE. The measurement report configuration request message may request the UE to transmit, when the reference signal measurement of the UE is greater than or equal to a preset first threshold, a measurement report message if the traffic amount is greater than or equal to the traffic threshold for SCell addition and no SCell is configured, and may request the UE to transmit, when the reference signal measurement of the UE is less than a preset second threshold, a measurement report message if the traffic amount is greater than or equal to the traffic threshold for SCell addition and an SCell is configured.

The controller 1630 may control a process of determining to add an SCell upon reception of a measurement report message when no SCell is configured, and determining to release an SCell upon reception of a measurement report message when an SCell is configured.

The operation of the eNB 1600 and the controller 1630 has been described above. However, in embodiments of the present invention, the eNB 1600 is not limited to the above configuration. For example, the eNB 1600 may have a configuration as shown in FIG. 1. In addition, the controller 1630 may control the operation of the base station according to the embodiment of the present invention described with reference to FIGS. 1 to 15 as well as the function and operation described with reference to FIG. 16.

Figure 17:
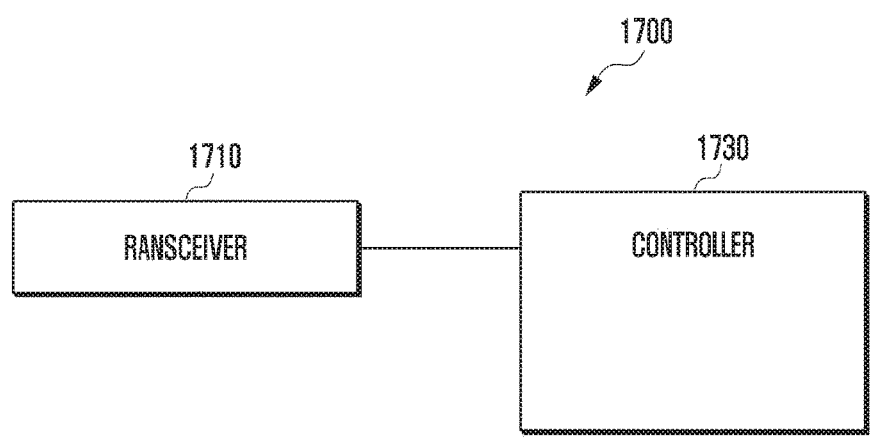
FIG. 17 illustrates a user equipment according to an embodiment of the present invention.

FIG. 17 illustrates a user equipment (UE) according to an embodiment of the present invention.

With reference to FIG. 17, the UE 1700 may include at least a transceiver 1710 to transmit and receive signals, and a controller 1730 to control the overall operation of the UE 1700.

In one embodiment of the present invention, the controller 1730 may control a process of maintaining a connection to at least one cell of an eNB, receiving an SCell addition request message for the UE from the eNB, and configuring an SCell in the UE on the basis of the SCell addition request message. Here, the SCell addition request message may be based on the CA operation mode of the eNB and the amount of traffic for the UE.

The CA operation mode may include a first mode where whether to add an SCell is determined according to PCell addition and release, and a second mode where whether to add an SCell is determined according to PCell addition and a measurement report from the UE.

When the CA operation mode is the first mode, the SCell addition request message may request the UE to add an SCell if the traffic amount is greater than or equal to a preset traffic threshold for SCell addition, and may request the UE to release an SCell if the traffic amount is less than a preset traffic threshold for SCell release. The controller may control a process of adding or releasing an SCell according to the SCell addition request message.

In addition, the controller 1730 may control a process of receiving a measurement report configuration request message from the eNB, and transmitting a measurement report message to the eNB according to the measurement report configuration request message. Here, the measurement report configuration request message may request the UE to transmit, when the reference signal measurement of the UE is greater than or equal to a preset first threshold, a measurement report message if the traffic amount is greater than or equal to the traffic threshold for SCell addition and no SCell is configured, and may request the UE to transmit, when the reference signal measurement of the UE is less than a preset second threshold, a measurement report message if the traffic amount is greater than or equal to the traffic threshold for SCell addition and an SCell is configured.

The operation of the UE 1700 and the controller 1730 has been described above. However, in embodiments of the present invention, the UE 1700 is not limited to the above configuration. In addition, the controller 1730 may control the operation of the user equipment according to the embodiment of the present invention described with reference to FIGS. 1 to 15 as well as the function and operation described with reference to FIG. 17.

Hereinabove, embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method of configuring a secondary cell (SCell) for a base station (eNB) in a mobile communication system, the method comprising:
   identifying a carrier aggregation (CA) operation mode determined based on whether to use a measurement report received from a user equipment (UE) to determine addition or release of the SCell;
   identifying an amount of traffic for the UE;
   determining whether to add the SCell in the UE based on the CA operation mode and the traffic amount for the UE; and
   transmitting an SCell addition request message to the UE according to the determination.

2. The method of claim 1, wherein the CA operation mode comprises a first mode where whether to add an SCell is determined according to a primary cell (PCell) addition and a PCell release, and a second mode where whether to add an SCell is determined according to a PCell addition and a measurement report from the UE.

3. A base station (eNB) in a mobile communication system, comprising:
   a transceiver configured to transmit and receive signals; and
   a controller configured to:
      control a process of identifying a carrier aggregation (CA) operation mode determined based on whether to use a measurement report received from a user equipment (UE) to determine addition or release of a secondary cell (S Cell),
      identify an amount of traffic for the UE,
      determine whether to add the SCell in the UE based on the CA operation mode and the traffic amount for the UE, and
      control the transceiver to transmit an SCell addition request message to the UE according to the determination result.

4. The base station of claim 3, wherein the CA operation mode comprises a first mode where whether to add an SCell is determined according to a primary cell (PCell) addition and a PCell release, and a second mode where whether to add an SCell is determined according to a PCell addition and a measurement report from the UE.

5. The base station of claim 4, wherein, when the CA operation mode is the first mode, the controller is further configured to control a process of:
   determining to add an SCell if the traffic amount is greater than or equal to a preset traffic threshold for adding the SCell, and determining to release an SCell if the traffic amount is less than a preset traffic threshold for releasing the SCell.

6. The base station of claim 4, wherein, when the CA operation mode is the second mode, the controller is further configured to control a process of:
transmitting a measurement report configuration request message to the UE based on the traffic amount and the SCell addition; and
receiving a measurement report message from the UE,
wherein, if the traffic amount is greater than or equal to the traffic threshold for adding the SCell and no SCell is configured, the measurement report configuration request message requests the UE to transmit a measurement report message when a reference signal measurement of the UE is greater than or equal to a preset first threshold, and
wherein, if the traffic amount is greater than or equal to the traffic threshold for adding the SCell and an SCell is configured, the measurement report configuration request message requests the UE to transmit a measurement report message when the reference signal measurement of the UE is less than a preset second threshold.

7. The base station of claim 6, wherein, upon reception of the measurement report message, the controller is further configured to control a process of determining, if no SCell is configured, to add an SCell, and determining, if an SCell is configured, to release the SCell.

8. A method of configuring a secondary cell (SCell) for a user equipment (UE), the method comprising:
maintaining a connection to at least one cell of a base station (eNB);
determining whether to perform a cell measurement based on a carrier aggregation (CA) operation mode to determine addition or release of the SCell;
receiving an SCell addition request message for the UE from the eNB; and
configuring an SCell in the UE based on the SCell addition request message,
wherein the SCell addition request message is based on the CA operation mode and an amount of traffic for the UE.

9. The method of claim 8, wherein the CA operation mode comprises a first mode where whether to add an SCell is determined according to a primary cell (PCell) addition and a PCell release, and a second mode where whether to add an SCell is determined according to a PCell addition and a measurement report from the UE.

10. The method of claim 9,
wherein, when the CA operation mode is the first mode, the SCell addition request message requests the UE to add an SCell if the traffic amount is greater than or equal to a preset traffic threshold for adding the SCell, and
wherein, when the CA operation mode is the first mode, the SCell addition request message requests the UE to release an SCell if the traffic amount is less than a preset traffic threshold for releasing the SCell.

11. The method of claim 9, further comprising, when the CA operation mode is the second mode:
receiving a measurement report configuration request message from the eNB;
performing a reference signal measurement in response to the measurement report configuration request message; and
transmitting a measurement report message to the eNB based on the reference signal measurement, wherein, if the traffic amount is greater than or equal to the traffic threshold for adding the SCell and no SCell is configured, the measurement report configuration request message requests the UE to transmit the measurement report message when a reference signal measurement of the UE is greater than or equal to a preset first threshold, and
wherein, if the traffic amount is greater than or equal to the traffic threshold for adding the SCell and an SCell is configured, the measurement report configuration request message requests the UE to transmit the measurement report message when the reference signal measurement of the UE is less than a preset second threshold.

12. A user equipment (UE) comprising:
a transceiver configured to transmit and receive signals; and
a controller configured to control a process of:
maintaining a connection to at least one cell of a base station (eNB), receiving a secondary cell (SCell) addition request message from the eNB,
determining whether to perform a cell measurement based on a carrier aggregation (CA) operation mode to determine addition or release of the SCell, and
configuring an SCell in the UE based on the SCell addition request message,
wherein the SCell addition request message is determined based on a carrier aggregation (CA) operation mode and an amount of traffic for the UE.

13. The user equipment of claim 12, wherein the CA operation mode comprises a first mode where whether to add an SCell is determined according to a primary cell (PCell) addition and a PCell release, and a second mode where whether to add an SCell is determined according to a PCell addition and a measurement report from the UE.

14. The user equipment of claim 13,
wherein, when the CA operation mode is the first mode, the SCell addition request message requests the UE to add an SCell if the traffic amount is greater than or equal to a preset traffic threshold for adding the SCell, and
wherein, when the CA operation mode is the first mode, the SCell addition request message requests the UE to release an SCell if the traffic amount is less than a preset traffic threshold for releasing the SCell.

15. The user equipment of claim 13, wherein, when the CA operation mode is the second mode, the controller is configured to control a process of:
receiving a measurement report configuration request message from the eNB,
performing a reference signal measurement in response to the measurement report configuration request message, and
transmitting a measurement report message to the eNB based on the reference signal measurement,
wherein, if the traffic amount is greater than or equal to the traffic threshold for adding the SCell and no SCell is configured, the measurement report configuration request message requests the UE to transmit the measurement report message when a reference signal measurement of the UE is greater than or equal to a preset first threshold, and
wherein, if the traffic amount is greater than or equal to the traffic threshold for adding the SCell and an SCell is configured, the measurement report configuration request message requests the UE to transmit the measurement report message when the reference signal measurement of the UE is less than a preset second threshold.

\* \* \* \* \*